US011805545B2

(12) United States Patent
Pham Van et al.

(10) Patent No.: US 11,805,545 B2
(45) Date of Patent: Oct. 31, 2023

(54) METHODS AND APPARATUSES FOR MOBILE-TERMINATED EARLY DATA TRANSMISSION SIGNALLING

(71) Applicant: Telefonaktiebolaget LM Ericsson (publ), Stockholm (SE)

(72) Inventors: Dung Pham Van, Täby (SE); Magnus Stattin, Upplands Väsby (SE); Emre Yavuz, Stockholm (SE); Andreas Höglund, Solna (SE); Tuomas Tirronen, Helsinki (FI)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 300 days.

(21) Appl. No.: 17/287,611

(22) PCT Filed: Nov. 1, 2019

(86) PCT No.: PCT/SE2019/051104
§ 371 (c)(1),
(2) Date: Apr. 22, 2021

(87) PCT Pub. No.: WO2020/091685
PCT Pub. Date: May 7, 2020

(65) Prior Publication Data
US 2021/0400715 A1    Dec. 23, 2021

Related U.S. Application Data

(60) Provisional application No. 62/754,473, filed on Nov. 1, 2018.

(51) Int. Cl.
*H04W 74/04*    (2009.01)
*H04W 76/19*    (2018.01)
(Continued)

(52) U.S. Cl.
CPC ......... *H04W 74/04* (2013.01); *H04W 68/005* (2013.01); *H04W 74/0841* (2013.01); *H04W 76/19* (2018.02); *H04W 76/20* (2018.02)

(58) Field of Classification Search
CPC ..... H04W 74/04; H04W 76/19; H04W 76/20; H04W 68/005; H04W 74/0841;
(Continued)

(56) References Cited

U.S. PATENT DOCUMENTS

2018/0132304 A1*    5/2018    Lee ................. H04W 76/38
2018/0323856 A1*    11/2018    Xiong ............... H04W 24/04
(Continued)

FOREIGN PATENT DOCUMENTS

WO    2010019364 A1    2/2010
WO    WO-2010019364 A1 *    2/2010    ........ H04W 36/0022

OTHER PUBLICATIONS

MT-initiated EDT Chengdu, China; Aug. 10, 2018 (Year: 2018).*
(Continued)

*Primary Examiner* — Mewale A Ambaye
(74) *Attorney, Agent, or Firm* — Christopher & Weisberg, P.A.

(57) ABSTRACT

A network node is configured for transmitting a mobile-terminated early data transmission during a random-access procedure. The network node transmits a page having a contention-free preamble corresponding to an identity associated with a wireless device to be paged. The identity may be a Serving Temporary Mobile Subscriber Identity, S-TMSI, or a resume identity that identifies a suspended Radio Resource Control, RRC, connection. The network node then receives, as part of the random-access procedure, a Msg1 transmission that includes the contention-free preamble. The network node next transmits, as part of the random-access procedure, a Msg2 transmission to the wire-
(Continued)

less device associated with the identity corresponding to the contention-free preamble. The Msg2 transmission includes a signaling message and downlink data.

20 Claims, 21 Drawing Sheets

(51) Int. Cl.
*H04W 76/20* (2018.01)
*H04W 68/00* (2009.01)
*H04W 74/08* (2009.01)

(58) Field of Classification Search
CPC . H04W 74/02; H04W 36/0033; H04W 40/36; H04W 74/085; H04W 74/08; H04W 88/02; H04W 88/08; H04W 68/00
See application file for complete search history.

(56) References Cited

U.S. PATENT DOCUMENTS

| | | | |
|---|---|---|---|
| 2019/0037461 A1* | 1/2019 | Li | H04W 80/02 |
| 2019/0215685 A1* | 7/2019 | Wang | H04W 80/08 |
| 2019/0254064 A1* | 8/2019 | Islam | H04W 74/0883 |
| 2019/0387541 A1* | 12/2019 | Agiwal | H04W 74/006 |
| 2021/0051736 A1* | 2/2021 | Jeon | H04W 76/18 |

OTHER PUBLICATIONS

International Search Report and Written Opinion dated Feb. 24, 2020 for International Application No. PCT/SE2019/051104 filed Nov. 1, 2019, consisting of 11-pages.
3GPP TS 36.331 V14.4.0; 3rd Generation Partnership Project; Technical Specification Group Radio Access Network; Evolved Universal Terrestrial Radio Access (E-UTRA); Radio Resource Control (RRC); Protocol specification (Release 14), Sep. 2017, consisting of 753-pages.
3GPP TS 36.321 V14.4.0; 3rd Generation Partnership Project; Technical Specification Group Radio Access Network; Evolved Universal Terrestrial Radio Access (E-UTRA); Medium Access Control (MAC) protocol specification (Release 14), Sep. 2017, consisting of 108-pages.
ETSI TS 136 323 V15.0.0; LTE; Evolved Universal Terrestrial Radio Access (E-UTRA); Packet Data Convergence Protocol (PDCP) specification (3GPP TS 36.323 version 15.0.0 Release 15), Jul. 2018, consisting of 52-pages.
3GPP TS 36.413 V14.4.0; 3rd Generation Partnership Project; Technical Specification Group Radio Access Network; Evolved Universal Terrestrial Radio Access Network (E-UTRAN); S1 Application protocol (S1AP) (Release 14), Sep. 2017, consisting of 353-pages.
ETSI TS 136 300 V14.4.0; LTE; Evolved Universal Terrestrial Radio Access (E-UTRA) and Evolved Universal Terrestrial Radio Access Network (E-UTRAN); Overall description; Stage 2 (3GPP TS 36.300 version 14.4.0 Release 14), Oct. 2017, consisting of 348-pages.
3GPP TS 33.401 V15.1.0; 3rd Generation Partnership Project; Technical Specification Services and System Aspects; 3GPP System Architecture Evolution (SAE); Security architecture (Release 15), Sep. 2017, consisting of 161-pages.
3GPP TSG-RAN WG2 #105bis R2-1903828 revision of R2-1900734; Title: MT early data after preamble; Agenda Item: 12.1.2; Source: Ericsson; Document for: Discussion, Decision; Date and Location: Apr. 8-12, 2019, Xi'An, China, consisting of 8-pages.
3GPP TSG-RAN WG2 #106 R2-1906931; Title: Handling UE context for Msg2-based MT UP-EDT; Agenda Item: 12.1.2; Source: Ericsson; Document for: Discussion, Decision; Date and Location: May 13-17, 2019, Reno, Nevada, USA, consisting of 6-pages.
3GPP TSG-RAN WG2 Meeting #103 R2-1811885; Title: Mobile terminated early data transmission; Agenda Item: 9.14.2 Early Data Transmission; Source: Institute for Information Industry (III); Document for: Discussion, Decision; Date and Location: Aug. 20-24, 2018, Gothenburg, Sweden, consisting of 3-pages.
3GPP TSG-RAN WG2 #103bis R2-1814037; Title: MT-initiated EDT; Agenda Item: 12.1.2, 12.2.2; Source: Qualcomm Incorporated; Document for: Discussion/Decision; Date and Location: Oct. 8-12, 2018 Chengdu, China, consisting of 6-pages.
3GPP TSG-RAN WG2 Meeting #103 R2-1814351; Title: Mobile terminated early data transmission; Agenda Item: 12.1.2 Mobile-terminated (MT) early data transmission (EDT); Source: Institute for Information Industry (III); Document for: Discussion, Decision; Date and Location: Oct. 8-12, 2018, Chengdu, China, consisting of 5-pages.

\* cited by examiner

METHODS AND APPARATUSES FOR MOBILE-TERMINATED EARLY DATA TRANSMISSION SIGNALLING

CROSS-REFERENCE TO RELATED APPLICATIONS

This application is a Submission Under 35 U.S.C. § 371 for U.S. National Stage Patent Application of International Application No.: PCT/SE2019/051104, filed Nov. 1, 2019 entitled "METHODS AND APPARATUSES FOR MOBILE-TERMINATED EARLY DATA TRANSMISSION SIGNALLING," which claims priority to U. S. Provisional Application No.: 62/754,473, filed Nov. 1, 2018, the entireties of both of which are incorporated herein by reference.

TECHNICAL FIELD

The present application relates generally to early data transmission in a wireless communication system, and relates more particularly to signalling for mobile-terminated early data transmission.

BACKGROUND

When a wireless communication network receives downlink data intended for a wireless device, the network transmits a paging message to the wireless device. After receiving the paging message, the wireless device performs a random-access procedure. Through the random-access procedure, the wireless device among other things acquires uplink timing and may establish or resume a Radio Resource Control (RRC) connection. After the random-access procedure, the network may then transmit the downlink data to the wireless device.

Transmitting the downlink data to the wireless device earlier, such as during the random-access procedure rather than only after that procedure, would advantageously reduce device power consumption and latency. One approach to realizing such so-called early data transmission (EDT) is to transmit the downlink data to the wireless device within the last message of the random-access procedure, also referred to as Message 4 (Msg4). This proves quite feasible in that the wireless device may transmit its identity to the network within the previous message, Message 3, of the random-access procedure. And it is this identity (e.g., in the form of a ResumeID or a Serving Temporary Mobile Subscriber Identity, 5-TMSI) that the radio network needs, e.g., in order to connect to the core network for retrieving the downlink data for the wireless device, in order to activate security for protecting the downlink data, in order to activate radio bearers, etc.

Transmitting the downlink data to the wireless device even earlier than the last message of the random-access procedure would advantageously further reduce device power consumption and latency. Challenges exist, however, to enable the radio network to connect with the core network to receive the downlink data, as well as to provide security and reliability, at such an early stage.

SUMMARY

Before transmitting a page to a wireless device, a base station according to some embodiments herein selects a contention-free preamble to correspond to an identity (e.g., a ResumeID or S-TMSI) associated with the wireless device. The base station indicates this contention-free preamble within the page to the wireless device. Responsive to the page, the wireless device transmits the contention-free preamble to the base station in a Message 1 (Msg1) transmission of a random-access procedure. Notably, the base station at this early stage may already determine the identity associated with the wireless device from which the Msg1 transmission was received, by determining which identity corresponds to the contention-free preamble comprised in the Msg1 transmission, e.g., since different contention-free preambles may correspond to different identities. The base station may thereby use the identity associated with the wireless device to establish or resume a connection with the core network for receiving the downlink data, activate security for protecting the downlink data, and the like, all before the Message 2 (Msg2) transmission of the random access procedure. The base station may then transmit the downlink data to the wireless device within the Msg2 transmission. According to some embodiments, enabling early data transmission to the wireless device via the Msg2 transmission of a random access procedure advantageously reduces device power consumption and latency, while also ensuring the security and reliability of the downlink data.

More particularly, embodiments herein include a method performed by a network node (e.g., in the form of a base station) for transmitting a mobile-terminated early data transmission during a random-access procedure according to some embodiments. The method comprises transmitting a page comprising a contention-free preamble corresponding to an identity associated with a wireless device to be paged. In some embodiments, the identity is a Serving Temporary Mobile Subscriber Identity, S-TMSI, or is a resume identity that identifies a suspended Radio Resource Control, RRC, connection. In any event, the method further comprises receiving, as part of the random-access procedure, a Msg1 transmission that comprises the contention-free preamble. In some embodiments, the Msg1 transmission does not include the identity associated with the wireless device. Regardless, the method then comprises transmitting, as part of the random-access procedure, a Msg2 transmission to the wireless device associated with the identity corresponding to the contention-free preamble. The Msg2 transmission comprises a signaling message and downlink data.

In some embodiments, the method further comprises receiving a paging message from a core network node, e.g., an S-GW or MME. The paging message includes the identity associated with the wireless device to be paged. The method may further include selecting, from a group of contention-free preambles (e.g., that is not specific for early data transmission), the contention-free preamble to correspond to the identity associated with the wireless device to be paged.

Alternatively or additionally, the method may further comprise, upon receiving the Msg1 transmission, determining the identity associated with the wireless device from which the Msg1 transmission is received, by determining which identity corresponds to the contention-free preamble comprised in the Msg1 transmission.

In some embodiments, the method may include, responsive to receiving the Msg1 transmission, using the identity corresponding to the contention-free preamble comprised in the Msg1 transmission to establish or resume a connection that is with a core network node and that is for the wireless device associated with the identity. In this case, the method may also comprise receiving the downlink data for the wireless device over the established or resumed connection with the core network node. In some embodiments, receiving the downlink data comprises receiving the downlink data in a non-access stratum, NAS, message which is protected with NAS security associated with the identity corresponding to the contention-free preamble comprised in the Msg1 transmission. In this case, transmitting the Msg2 transmission comprises forwarding the NAS message with the downlink data to the wireless device in a Radio Resource Control, RRC, message.

In some embodiments, the method further comprises, upon receiving the Msg1 transmission, re-activating access stratum security for the wireless device associated with the identity that corresponds to the contention-free preamble comprised in the Msg1 transmission. The method may then comprise protecting the Msg2 transmission using the re-activated access stratum security.

In some embodiments, the method further comprises transmitting the Msg2 transmission using a Radio Network Temporary Identity that is specific to the wireless device and specific for mobile-terminated early data transmission.

In some embodiments, the contention-free preamble comprised in the page is encoded as a function of information known by the wireless device to be paged and by a core network node that initiated the page.

Other embodiments herein include a method performed by a wireless device for receiving a mobile-terminated early data transmission during a random-access procedure according to some embodiments. The method comprises receiving, from a network node, a page comprising a contention-free preamble corresponding to an identity associated with the wireless device. In some embodiments, the identity is a Serving Temporary Mobile Subscriber Identity, S-TMSI, or is a resume identity that identifies a suspended Radio Resource Control, RRC, connection. In any event, the method further comprises transmitting, in response to the page and as part of the random-access procedure, a Msg1 transmission that comprises the contention-free preamble. In some embodiments, the Msg1 transmission does not include the identity associated with the wireless device. Regardless, the method may then comprise receiving, as part of the random-access procedure, a Msg2 transmission from the network node. The Msg2 transmission comprises a signaling message and downlink data.

In some embodiments, the method further comprises checking an integrity of the signaling message, and/or de-ciphering the downlink data, using security associated with the identifier corresponding to the contention-free preamble. For example, in some embodiments, the identifier is the S-TMSI and said security is non-access stratum, NAS, security. In other embodiments, the identifier is the S-resume identity and wherein said security is access stratum, AS, security.

Alternatively or additionally, in some embodiments, the method may comprise, after receiving the page but before receiving the Msg2 transmission, re-activating AS security associated with the identifier corresponding to the contention-free preamble.

In some embodiments, the method further comprises monitoring for the Msg2 transmission using a Radio Network Temporary Identity that is specific to the wireless device and specific for mobile-terminated early data transmission.

In some embodiments, the contention-free preamble is not specific for early data transmission.

In some embodiments, the method further comprises decoding the contention-free preamble comprised in the page as a function of information known by the wireless device and by a core network node that initiated the page.

Embodiments herein also include corresponding apparatus, computer programs, and carriers such as non-transitory computer-readable mediums. For example, embodiments herein include a network node (e.g., in the form of a base station) for transmitting a mobile-terminated early data transmission during a random-access procedure according to some embodiments. The network node is configured (e.g., via communication circuitry and processing circuitry) to transmit a page comprising a contention-free preamble corresponding to an identity associated with a wireless device to be paged. In some embodiments, the identity is a Serving Temporary Mobile Subscriber Identity, S-TMSI, or is a resume identity that identifies a suspended Radio Resource Control, RRC, connection. In any event, the network node is further configured to receive, as part of the random-access procedure, a Msg1 transmission that comprises the contention-free preamble. In some embodiments, the Msg1 transmission does not include the identity associated with the wireless device. Regardless, the network node is also configured to transmit, as part of the random-access procedure, a Msg2 transmission to the wireless device associated with the identity corresponding to the contention-free preamble. The Msg2 transmission comprises a signaling message and downlink data.

Embodiments moreover include a wireless device for receiving a mobile-terminated early data transmission during a random-access procedure according to some embodiments. The wireless device is configured (e.g., via communication circuitry and processing circuitry) to receive, from a network node, a page comprising a contention-free preamble corresponding to an identity associated with the wireless device. In some embodiments, the identity is a Serving Temporary Mobile Subscriber Identity, S-TMSI, or is a resume identity that identifies a suspended Radio Resource Control, RRC, connection. In any event, the wireless device is further configured to transmit, in response to the page and as part of the random-access procedure, a Msg1 transmission that comprises the contention-free preamble. In some embodiments, the Msg1 transmission does not include the identity associated with the wireless device. Regardless, the wireless device is also configured to receive, as part of the random-access procedure, a Msg2 transmission from the network node. The Msg2 transmission comprises a signaling message and downlink data.

DETAILED DESCRIPTION

Figure 1:
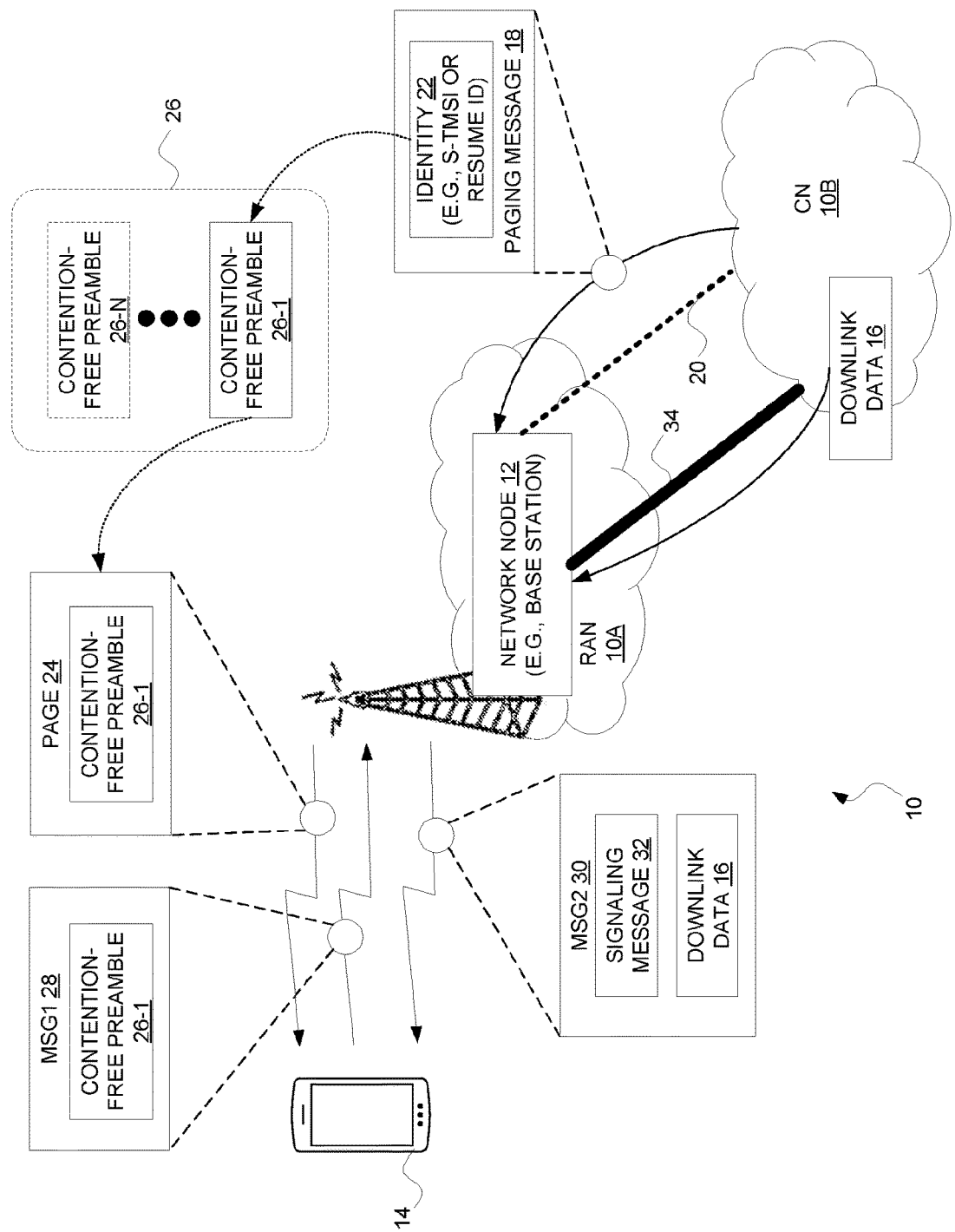
FIG. 1 is a block diagram of a wireless communication system according to some embodiments.

FIG. 1 shows a wireless communication system 10 according to some embodiments. The wireless communication system 10 includes a radio access network (RAN) 10A and a core network (CN) 10B. The RAN 10A includes a network node 12, such as a base station, that serves one or more wireless devices, one of which is shown as wireless device 14. The network node 12 in this regard provides radio access to these one or more wireless devices. The radio access may for instance be based on Long Term Evolution (LTE) or New Radio (NR). Regardless, the RAN 10A interconnects the wireless device 14 to the CN 10B, which may include network functionality that is independent of the radio access and which may provide access to one or more external data networks.

In this context, downlink data 16 destined for the wireless device 14 arrives at the CN 10B according to some embodiments. The CN 10B accordingly initiates a paging procedure for paging the wireless device 14. FIG. 1 in this regard shows the CN 10B transmitting a paging message 18 to the network node 12 that serves the wireless device 14 to be paged. The CN 10B may transmit the paging message 18 to the network node 12 over a control plane connection 20 (e.g., an S1 control plane connection) with the network node 12. The paging message 18 may include an identity 22 associated with the wireless device 14 to be paged. The identity 22 may for instance be a Serving Temporary Mobile Subscriber Identity (S-TMSI). In other embodiments, the identity 22 may be a resume identity (also abbreviated as resumeID) that identifies a suspended Radio Resource Control (RRC) connection (between the wireless device 14 and the RAN 10A).

Responsive to receiving the paging message 18 from the CN 10B, the network node 12 in turn transmits a page 24 to the wireless device 14. The network node 12 may do so as part of paging an area (e.g., a CN tracking area or a RAN notification area) within which the wireless device 14 is known or believed to be located. The page 24 comprises (e.g., includes or otherwise indicates) a contention-free preamble 26-1 that the wireless device 14 being paged is to use for performing a random access procedure. Indeed, as shown in FIG. 1, the wireless device 14 in response to the page 24 transmits to the network node 12, as part of a random access procedure, a Message 1 (Msg1) transmission 28 that comprises this contention-free preamble 26-1. The Msg1 transmission 28 may for instance be the first transmission in the random access procedure. The contention-free preamble 26-1 is contention-free in the sense that the preamble 26-1 is allocated to the wireless device 14 in a dedicated manner, meaning that use of the contention-free preamble 26-1 frees the wireless device 14 from contending with other wireless devices that might have otherwise used the same preamble for attempting random access.

Notably, the contention-free preamble 26-1 comprised in the page 24 to the wireless device 14 corresponds to the identity 22 associated with the wireless device 14, e.g., S-TMSI or resume identity. In some embodiments, for example, when the network node 12 receives the paging message 18 from the CN 10B, the network node 12 selects, from among a group 26 of multiple contention-free preambles 26-1 . . . 26-N, a contention-free preamble 26-1 to correspond to the identity 22 associated with the wireless device 14 to be paged. That is, the network node 12 dynamically creates a correspondence between the contention-free preamble 26-1 and the identity 22 through this preamble selection. The network node 12 may accordingly store the correspondence between the contention-free preamble 26-1 and the identity 22 associated with the wireless device 14. The network node 12 may do so in conjunction with storing the respective correspondence between other contention-free preambles and other identities, such that different contention-free preambles in the group 26 correspond to different respective identities.

In these and other embodiments, then, when the network node 12 receives a Msg1 transmission 28 that comprises the contention-free preamble 26-1, the network node 12 may deduce, determine, or otherwise know the identity 22 associated with the wireless device 14 from which the Msg1 transmission 28 was received. Indeed, the correspondence between the contention-free preamble 26-1 and the identity 22 effectively means that the contention-free preamble 26-1 implicitly indicates or signals the identity 22 associated with the wireless device 14. This also means that the Msg1 transmission 28 does not need to actually include the identity 22 associated with the wireless device 14 in that Msg1 transmission 28, e.g., so as to advantageously minimize the size of the Msg1 transmission 28 and thereby the signaling overhead attributable to the random access procedure. Accordingly, the network node 12 in some embodiments, upon receiving the Msg1 transmission 28, determines the identity 22 associated with the wireless device 14 from which the Msg1 transmission 28 is received, by determining which identity corresponds to the contention-free preamble 26-1 comprised in the Msg1 transmission 28.

Equipped with knowledge about the identity 22 associated with the wireless device 14 from which the Msg1 transmission 28 was received, the network node 12 may use that identity 22 to transmit the downlink data 16 to the wireless device 14 already within a Message 2 (Msg2) transmission 30 of the random access procedure. As shown in FIG. 1, for example, the network node 12 transmits to the wireless device 14, as part of the random access procedure, a Msg2 transmission 30 that comprises a signaling message 32 (e.g., an RRC message) and the downlink data 16.

More particularly, in some embodiments, the network node 12 uses the identity 22 corresponding to the contention-free preamble 26-1 comprised in the Msg1 transmission 28 to establish or resume a connection 34 with the CN 10B for receiving the downlink data 16 for the wireless device 14. For example, in some embodiments that deliver the downlink data 16 to the wireless device 14 via the control plane, the network node 12 may use the identity 22 (e.g., in the form of the S-TMSI) to establish a connection 34 (e.g., an S1 control plane connection) with a core network node (e.g., a Mobility Management Entity, MME) that manages mobility for the wireless device 14. The network node 12 may for instance use the identity 22 to request the core network node to establish the connection 34. Alternatively, in other embodiments that deliver the downlink data 16 to the wireless device via the user plane, the network node 12 may use the identity 22 (e.g., in the form of a resume identity) to establish or resume a connection (e.g., an S1 user plane connection) with a core network node (e.g., a Serving Gateway, S-GW) that routes and handles data packets on the user plane. The network node 12 may for instance use the identity 22 to request the core network node to establish or resume the connection 34. In either case, the network node 12 may then receive the downlink data 16 from the core network node over the established or resumed connection 34, for then sending to the wireless device 14 within the Msg2 transmission 30.

Alternatively or additionally, some embodiments exploit correspondence of the identity 22 with the contention-free preamble 26-1 to securely convey the downlink data 16 in the Msg2 transmission 30. The wireless device 14 and/or network node 12 may for instance (re)activate security based on the identity 22, even before the Msg2 transmission 30. Activation or re-activation of security in this regard may entail putting into use a certain security context associated with the identity 22, where that security context includes information (e.g., keys, algorithms, etc.) for protecting the confidentiality and/or integrity of the downlink data 16.

Consider for instance embodiments where the downlink data 16 is conveyed over the user plane and the identity 22 is a resume identity that identifies an RRC connection that was suspended between the wireless device 14 and the network node 12 (or another network node from which the wireless device 14 was handed over). In this case, based on the wireless device 14 receiving a page 24 from the network node 12 that comprises a contention-free preamble 26-1, the wireless device 14 may understand that the Msg2 transmission 30 of the forthcoming random access procedure with that network node 12 will comprise downlink data 16 for the wireless device 14 and that the downlink data 16 will be protected based on the access stratum (AS) security associated with the resume identity 22. The wireless device 14 accordingly re-activates the AS security and radio bearers (except Signaling Radio Bearer #0, SRB0) associated with the resume identity 22. The wireless device 14 may do so at any point after receiving the page 24 but before receiving the Msg2 transmission 30, e.g., upon receiving the page 24 or after transmitting the Msg1 transmission. Notably, then, the wireless device 14 may re-activate AS security and radio bearers before or without signaling the resume identity, e.g., the Msg1 transmission need not include such resume identity given the correspondence between the resume identity and the contention-free preamble 26-1.

Similarly, after receiving the Msg1 transmission 28 comprising the contention-free preamble 26-1 that corresponds to the resume identity 22, the network node 12 may re-activate AS security and radio bearers (except SRB0) associated with that resume identity. If the wireless device 14 was handed over from another (source) network node, the network node 12 may retrieve the UE context from that source network node using a context fetch procedure with the resume identity. In any event, with AS security and radio bearers activated, the network node 12 may protect the Msg2 transmission 30 using the re-activated AS security and transmit the protected Msg2 transmission 30 to the wireless device 14. Protection of the Msg2 transmission 30 may include for instance integrity protection of the signaling message 32 and confidentiality protection (e.g., ciphering) of the downlink data 16. Correspondingly, the wireless device 14 upon receiving the Msg2 transmission 30 may check an integrity of the signaling message 32, and/or decipher the downlink data 16, using the re-activated AS security associated with the resume identity.

Consider next embodiments where the downlink data 16 is conveyed over the control plane and the identity 22 is an S-TMSI. In this case, based on the wireless device 14 receiving a page 24 from the network node 12 that comprises a contention-free preamble 26-1, the wireless device 14 may understand that the Msg2 transmission 30 of the forthcoming random access procedure with that network node 12 will comprise downlink data 16 for the wireless device 14 and that the downlink data 16 will be protected based on the non-access stratum (NAS) security associated with the S-TMSI. Indeed, the CN 10B (e.g., MME) in this case may include the downlink data 16 in a NAS message and protect the NAS message using NAS security associated with the S-TMSI. The network node 12 receives the NAS message and forwards the NAS message with the downlink data 16 to the wireless device 14 in an RRC message comprising the Msg2 transmission 30. The wireless device 14 accordingly checks an integrity of the NAS message, and/or deciphers the downlink data, using the NAS security associated with the S-TMSI.

No matter whether the downlink data 16 is conveyed via the user plane or the control plane, in some embodiments the contention-free preamble 26-1 is selected from a group 26 of contention-free preambles 26-1 . . . 26-N that is not specific to early data transmission (EDT); that is, not specifically dedicated for use in EDT. This advantageously avoids preamble partitioning that would otherwise reduce the number of preambles available for random access.

Alternatively or additionally, the Msg2 transmission 30 according to some embodiments is transmitted using a Radio Network Temporary Identity (RNTI) that is specific to the wireless device 14 and specific for EDT (e.g., mobile terminated, MT, EDT). The RNTI in this case may be referred to as an E-RNTI.

Figure 2:
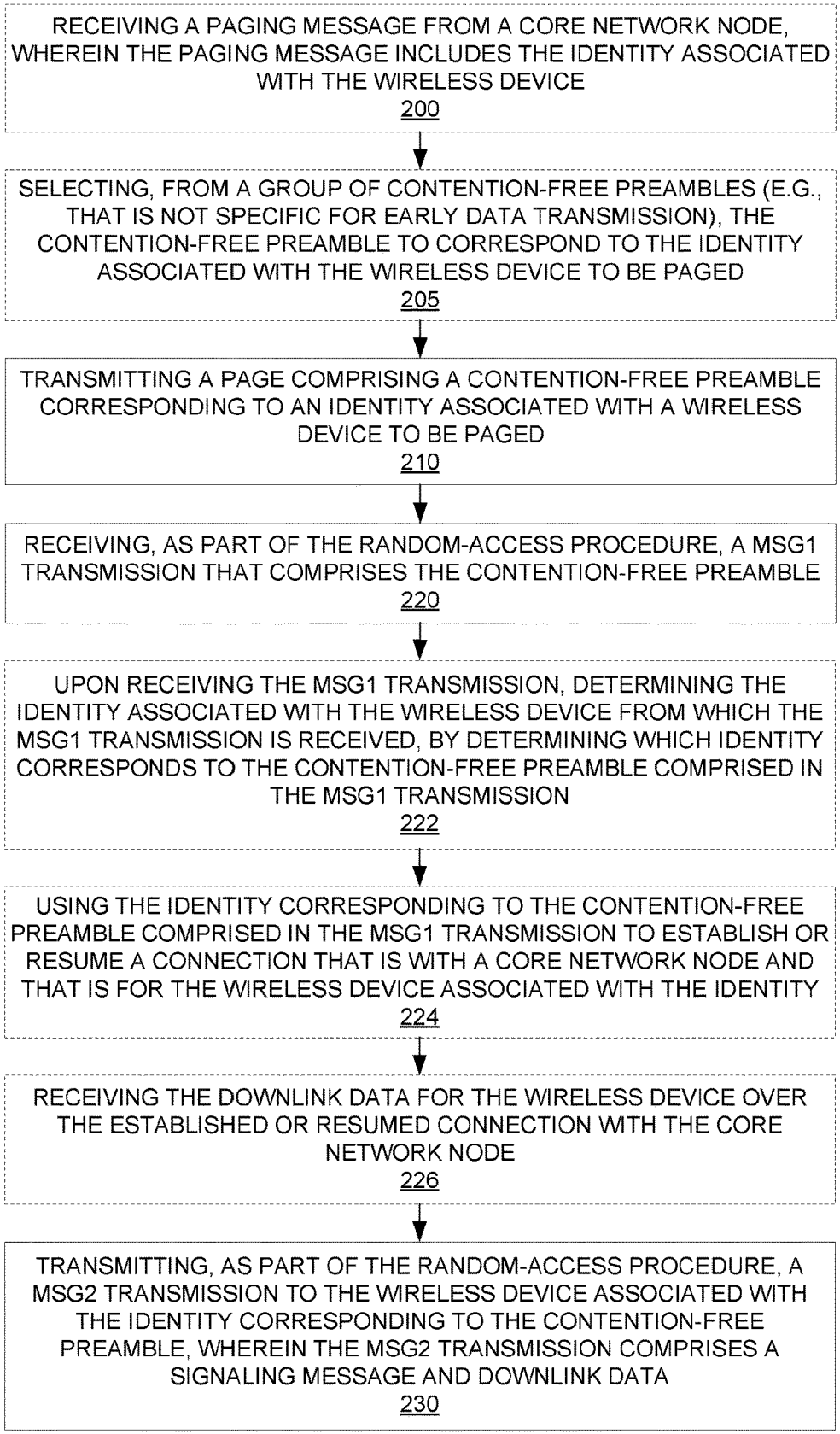
FIG. 2 is a logic flow diagram of a method performed by a network node according to some embodiments.

In view of the above modifications and variations, FIG. 2 shows a method performed by the network node 12 (e.g., in the form of a base station) for transmitting a mobile-terminated early data transmission during a random-access procedure according to some embodiments. The method comprises transmitting a page 24 comprising a contention-free preamble 26-1 corresponding to an identity 22 associated with a wireless device 14 to be paged (Block 210). In some embodiments, the identity 22 is a Serving Temporary Mobile Subscriber Identity, S-TMSI, or is a resume identity that identifies a suspended Radio Resource Control, RRC, connection. In any event, the method further comprises receiving, as part of the random-access procedure, a Msg1 transmission 28 that comprises the contention-free preamble 26-1 (Block 220). In some embodiments, the Msg1 transmission 28 does not include the identity 22 associated with the wireless device 14. The method then comprises transmitting, as part of the random-access procedure, a Msg2 transmission 30 to the wireless device 14 associated with the identity 22 corresponding to the contention-free preamble 26-1 (Block 230). The Msg2 transmission 30 comprises a signaling message 32 and downlink data 16.

More particularly, in some embodiments, the method comprises receiving a paging message 18 from a core network node, e.g., an S-GW or MME (Block 200). The paging message 18 includes the identity 22 associated with the wireless device 14. The method may further include selecting, from a group 26 of contention-free preambles 26-1 . . . 26-N(e.g., that is not specific for early data transmission), the contention-free preamble 26-1 to correspond to the identity 22 associated with the wireless device 14 to be paged (Block 205). With the contention-free preamble 26-1 selected, it is at this point that the method may comprise transmitting the page 24 comprising the contention-free preamble 26-1 corresponding to the identity 22 associated with the wireless device 14 to be paged (Block 210).

Alternatively or additionally, the method may further comprise, upon receiving the Msg1 transmission 28, determining the identity 22 associated with the wireless device 14 from which the Msg1 transmission 28 is received, by determining which identity corresponds to the contention-free preamble 26-1 comprised in the Msg1 transmission 28 (Block 222).

In some embodiments, the method may include, responsive to receiving the Msg1 transmission 28, using the identity 22 corresponding to the contention-free preamble 26-1 comprised in the Msg1 transmission 28 to establish or resume a connection 34 that is with a core network node and that is for the wireless device 14 associated with the identity 22 (Block 224). In this case, the method may also comprise receiving the downlink data 16 for the wireless device 14 over the established or resumed connection 34 with the core network node (Block 226). With the downlink data 16 received, then, the method may then include transmitting, as part of the random-access procedure, the Msg2 transmission 30 to the wireless device 14 associated with the identity 22 corresponding to the contention-free preamble 26-1 (Block 230).

Figure 3:
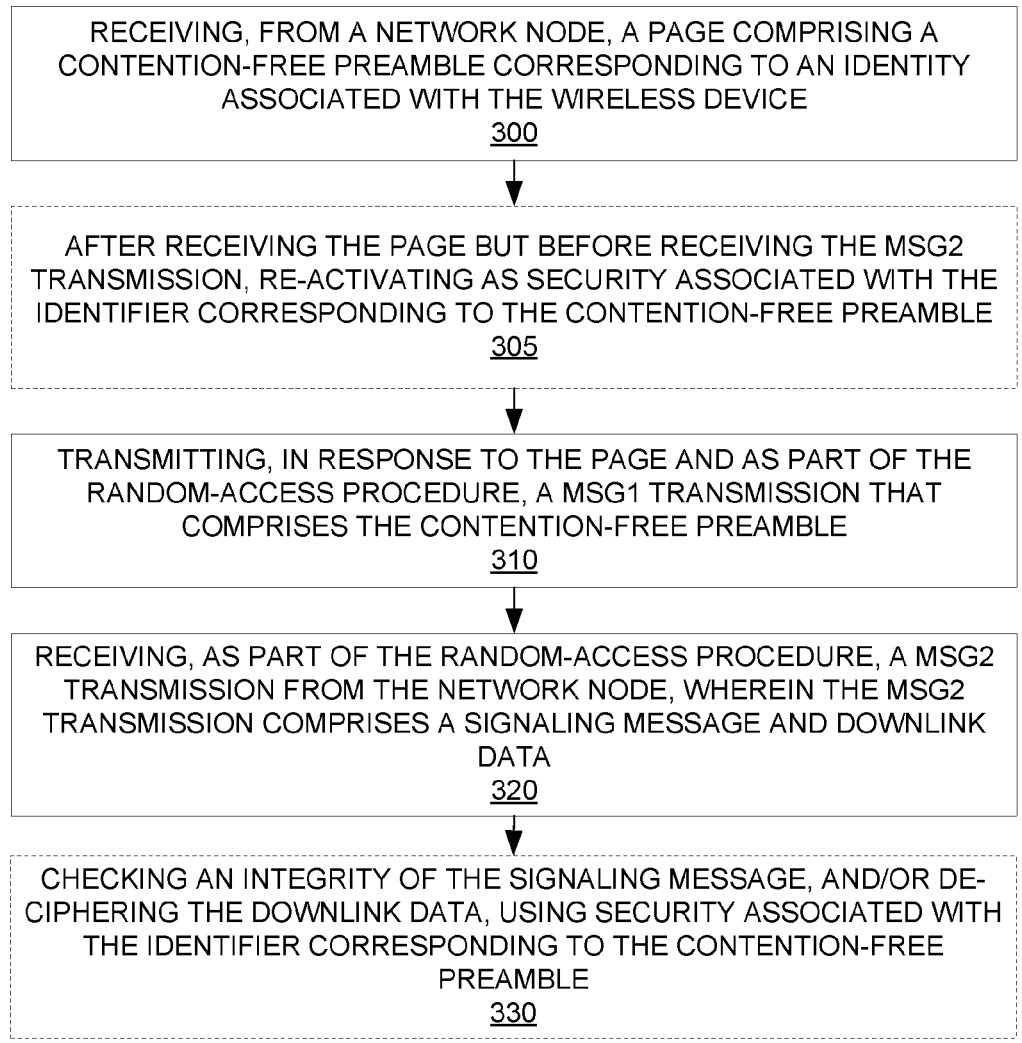
FIG. 3 is a logic flow diagram of a method performed by a wireless device according to some embodiments.

FIG. 3 shows a method performed by a wireless device 14 for receiving a mobile-terminated early data transmission during a random-access procedure according to some embodiments. The method comprises receiving, from a network node 12, a page 24 comprising a contention-free preamble 26-1 corresponding to an identity 22 associated with the wireless device 14 (Block 300). In some embodiments, the identity 22 is a Serving Temporary Mobile Subscriber Identity, 5-TMSI, or is a resume identity that identifies a suspended Radio Resource Control, RRC, connection. In any event, the method further comprises transmitting, in response to the page 24 and as part of the random-access procedure, a Msg1 transmission 28 that comprises the contention-free preamble 26-1 (Block 310). The method may then comprise receiving, as part of the random-access procedure, a Msg2 transmission 30 from the network node 12 (Block 320). The Msg2 transmission 30 comprises a signaling message 32 and downlink data 16.

In some embodiments, the method further comprises checking an integrity of the signaling message 32, and/or de-ciphering the downlink data 16, using security associated with the identifier 22 corresponding to the contention-free preamble 26-1 (Block 330). For example, in some embodiments, the identifier is the S-TMSI and said security is non-access stratum, NAS, security. In other embodiments, the identifier is the S-resume identity and wherein said security is access stratum, AS, security.

Alternatively or additionally, in some embodiments, the method may comprise, after receiving the page but before receiving the Msg2 transmission 30, re-activating AS security associated with the identifier 22 corresponding to the contention-free preamble 26-1 (Block 305).

The network node 12 and wireless device 14 described above may perform the methods herein and any other processing by implementing any functional means, modules, units, or circuitry. In one embodiment, for example, the network node 12 and/or wireless device 14 comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 4:
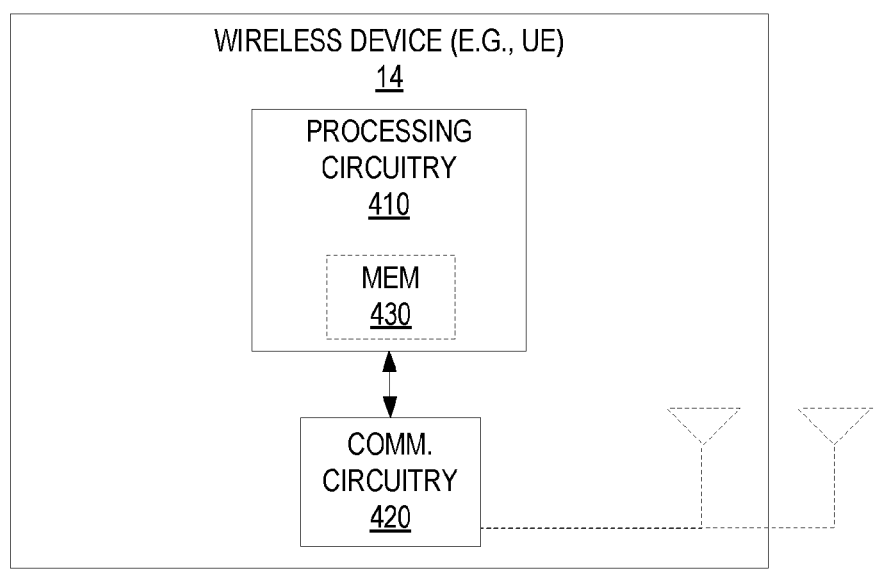
FIG. 4 is a block diagram of a network node according to some embodiments.

FIG. 4 for example illustrates the wireless device 14 as implemented in accordance with one or more embodiments. As shown, the wireless device 14 includes processing circuitry 410 and communication circuitry 420. The communication circuitry 420 (e.g., radio circuitry) is configured to transmit and/or receive information to and/or from one or more other nodes, e.g., via any communication technology. Such communication may occur via one or more antennas that are either internal or external to the wireless device 400. The processing circuitry 410 is configured to perform processing described herein, e.g., in FIG. 3, such as by executing instructions stored in memory 430. The processing circuitry 410 in this regard may implement certain functional means, units, or modules.

Figure 5:
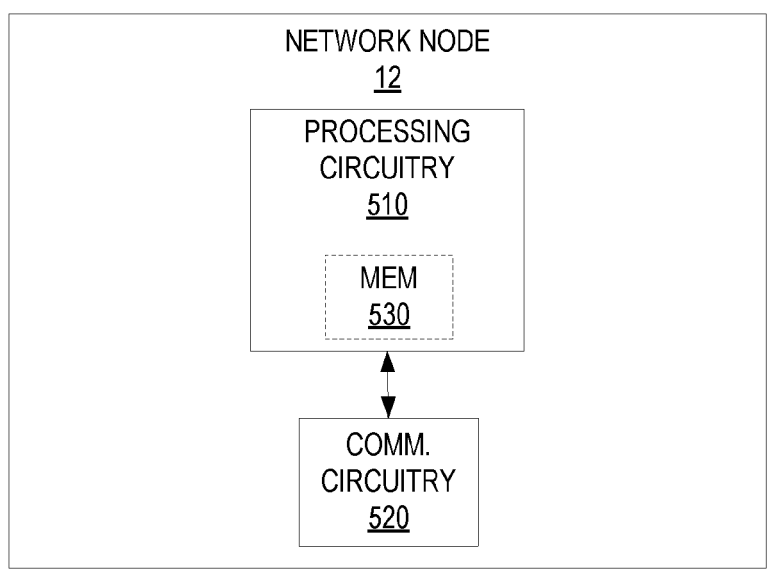
FIG. 5 is a block diagram of a wireless device according to some embodiments.

FIG. 5 illustrates the network node 12 as implemented in accordance with one or more embodiments. As shown, the network node 12 includes processing circuitry 510 and communication circuitry 520. The communication circuitry 520 is configured to transmit and/or receive information to and/or from one or more other nodes, e.g., via any communication technology. The processing circuitry 510 is configured to perform processing described herein, e.g., in FIG. 2, such as by executing instructions stored in memory 530. The processing circuitry 510 in this regard may implement certain functional means, units, or modules.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

There has been a lot of work in the 3rd Generation Partnership Project (3GPP) lately on specifying technologies to cover Machine-to-Machine (M2M) and/or Internet of Things (IoT) related use cases. Most recent work for 3GPP Release 13 and 14 includes enhancements to support Machine-Type Communications (MTC) with new user equipment (UE) categories (Cat-M1, Cat-M2), supporting reduced bandwidth of up to 6 and 24 physical resource blocks (PRBs), and Narrowband IoT (NB-IoT) UEs providing a new radio interface (and UE categories Cat-NB1 and Cat-NB2).

Long Term Evolution (LTE) enhancements introduced in 3GPP Release 13, 14, and 15 for Machine-Type Communications (MTC) will be referred to as enhanced MTC or "eMTC", including (but not limited to) support for bandwidth limited UEs, Cat-M1, and support for coverage enhancements. This is to separate discussions from NB-IoT (as covered by any Release), although the supported features are similar on a general level.

Figure 6:
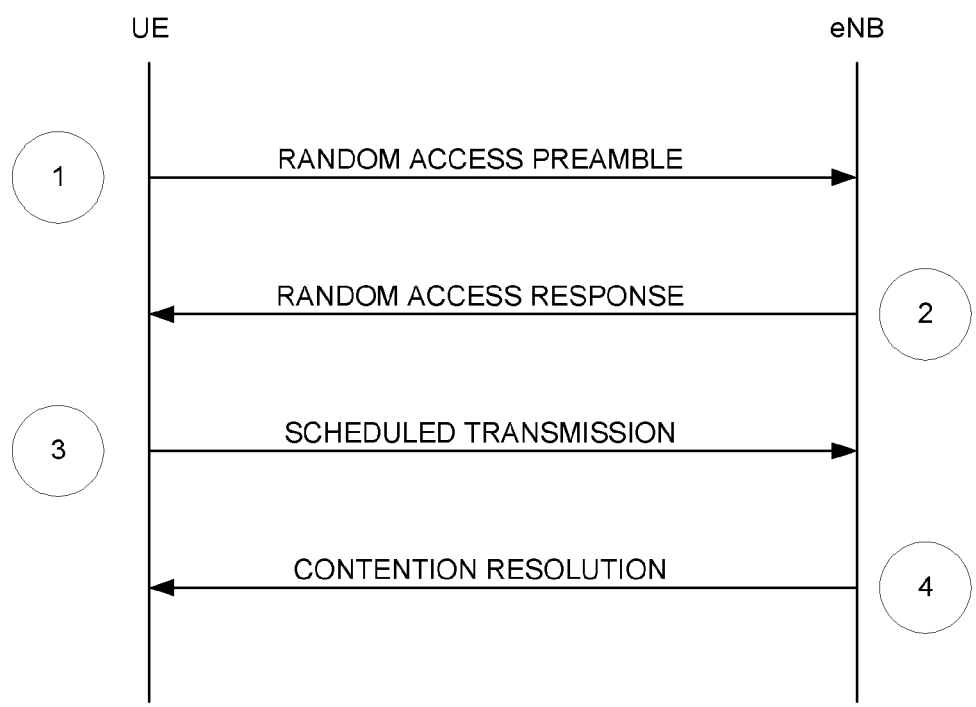
FIG. 6 is a call flow diagram of a random access procedure according to some embodiments.

The messages in the random access (RA) procedure are commonly referred to as message 1 (Msg1) through message 4 (Msg4). The contention-based RA procedure is illustrated in FIG. 6. See, e.g., 3GPP, TS 36.300, "E-UTRA and E-UTRAN; Overall description; Stage 2", v14.4.0, September 2017.

For both eMTC and NB-IoT, 'cellular internet of things (CIot) evolved packet system (EPS) user plane (UP) optimization' (aka CIoT EPS UP optimization) and 'CIoT EPS control plane (CP) optimization' signaling reductions were also introduced in Rel-13. The former, here referred to as the UP-solution, allows the UE to resume a previously stored Radio Resource Control (RRC) connection (e.g., RRC Suspend/Resume). The latter, here referred to as the CP-solution, allows the transmission of user-plane data over Non-Access Stratum (NAS) (aka data over NAS (DoNAS)).

In 3GPP Rel-15, the work items (WIs) "Even further enhanced MTC for LTE (LTE_eMTC4)" [WI_eMTC] and "Further NB-IoT enhancements (NB_IOTenh2)" [WI_NBIOT] target eMTC and NB-IoT enhancements. The common objective of these WIs is to reduce UE power consumption and latency through introducing possibilities to send data early during the Random Access (RA) procedure, or commonly referred to as early data transmission (EDT).

EDT has been extensively discussed from RAN2 #99. Since then it was agreed to support transmission of data in Msg3 only, in Msg4 only, or in both Msg3 and Msg4 depending on actual use cases for both Rel-13 UP and CP solutions. However, in Rel-15, only the EDT solutions for mobile-originated (MO) calls are specified. In MO EDT solutions, the UE with small uplink (UL) user data can indicate its intention of using EDT, i.e., sending UL user data in Msg3 by selecting an EDT preamble in Msg1. The eNB provides the UE with an EDT UL grant in Msg2 that allows the UE to transmit UL data together with signaling in Msg3. Depending on UL data condition, the UE can select a suitable (possible smallest) value of transport block size (TBS) among the possible values specified based on the maximum TBS value and the permitted number of blind decodes (i.e., number of TBS values smaller than the maximum value) informed by the eNB via system information. DL data (if any) can be included in Msg4 together with signaling that indicates the UE to return RRC_IDLE mode for power saving improvements if no more data transmission is expected. But if there is more user data, the network can, in Msg4, indicate the UE to move to RRC_CONNECTED mode, i.e., establishing or resuming the RRC connection as in legacy for further data transmissions.

In the Rel-16 WIs for both eMTC and NB-IoT, one of the objectives is to specify support for mobile terminated (MT) EDT. The intention to use MT-EDT is for user data, i.e. not for NAS signaling.

There currently exist certain challenges. In Rel-15 UP- and CP-EDT solutions for Mobile Oriented (MO) calls DL user data may be sent in Msg4 during the random access (RA) procedure. However, in the use cases of small MT DL data transmission, it may be desirable that DL user data can be sent to the UE even earlier than in Msg4 so that the signaling can be further reduced and hence improve UE battery life further as a result.

The first opportunity for transmission of MT DL data to the UE is the paging message. However, this would incur a large waste of resources in a cell and/or tracking area(s) since it requires transmission of DL data to a single UE with an unnecessarily large paging load, in a cell and/or all cells that belong to the same tracking area(s). In addition, UEs that share the same paging occasion in a cell may need to decode the large paging message unnecessarily. A slightly different version of the mechanism described above is to schedule the MT DL data in the paging message rather than providing the MT DL data in the paging message. This means a similar amount of resources would still be used, but the impact on the UE power consumption due to other UEs' attempts to decode the message would be less.

The next opportunity for transmission of MT DL data is in Msg2. It remains open how to develop MT CP- and UP-EDT solutions to realize the idea of MT DL data in/with Msg2. Among the challenging aspects, a particular hurdle is how can the eNB establish/resume a connection with the core network to receive DL data and at this early stage. In addition, there is also the challenge of providing security and reliability to the CP and UP solutions if so configured or required.

Certain aspects of the present disclosure and their embodiments may provide solutions to these or other challenges. In certain embodiments, MT early data transmission is provided together with signalling in Msg2, e.g., the DL message sent by the network node, e.g., eNB, in response to Msg1 from a UE with a contention-free preamble in the contention-free random-access procedure. Certain embodiments further address how to avoid the issue of preamble partitioning and extension and providing unused UL grants in CP and UP early data transmissions being considered for LTE, NB-IoT, and 5G/NR.

There are, proposed herein, various embodiments which address one or more of the issues disclosed herein. In certain embodiments, a network node, in response to receiving a Msg1 transmission from a wireless device, sends a Msg2 transmission to the wireless device, wherein the Msg2 transmission comprises a signalling message and downlink data. In certain embodiments, a wireless device, sends a Msg1 transmission in response to a page including a contention-free preamble, and receives a Msg2 transmission from a network node, wherein the Msg2 transmission comprises a signalling message and downlink data.

Generally, then, the present disclosure provides solutions allowing early transmission of MT DL data with reduced/minimal signaling required between the UE and the network. Certain techniques, systems, and methods disclosed herein may be used in LTE and NB-IoT contexts and may be further applicable for 5G/New Radio (NR).

Certain embodiments may provide one or more of the following technical advantage(s). For example, certain embodiments provide for earlier early data transmission during a random-access procedure. Providing earlier data transmission enables early data transmission for mobile terminated calls with a minimum of signalling exchange. Certain embodiments provide early data transmission during/with Msg2, including for both CP and UP CIoT EPS optimization solutions. The reduced signalling and early data transmission may further improve the battery life of the UE.

More particularly, in certain embodiments, security and/or reliability are supported in the delivery/transport of user 'data during the RA procedure' (EDT) including DL MT data in Msg2/Msg4 using CIoT EPS optimizations (including both CP and UP). In certain embodiments, secure and/or reliable/persistent delivery/transport of user 'data during the RA procedure' (EDT) including DL MT data in Msg2/Msg4 can be configurable per bearer.

In certain embodiments, support for MT EDT for the CP solution and support for MT EDT for the UP solution are considered separately with respect to UE capabilities. For the MT EDT capability, the UE network capability in the MME UE context is extended to include the support of CP- and UP-EDT In certain embodiments, the first steps of the Msg2 EDT procedure would be common for both the UP- and CP-specific solutions. An example procedure to enable MT DL data transmission with Msg2 in contention-free random access (CFRA) is provided below:

1. The UE may be paged with a paging record (in the paging message) that provides a dedicated contention free preamble. In case there is no contention-free preamble available, the network can fall back to solutions that provide MT data in Msg4.
2. The UE responds to the paging message with Msg1 transmission to the eNB from which the paging message is received using the dedicated preamble provided in the paging record.
3. The eNB, upon reception of the dedicated preamble, communicates with the core network (e.g., the MME/S-GW/SCEF) to retrieve the DL data for the UE. Here, MME refers to the Mobility Management Entity, S-GW refers to the Serving Gateway, and SCEF refers to the Service Capability Exposure Function.
4. The eNB then transmits the DL data in Msg2 to the UE with the identity matching the paging record in step 1.
5. (optionally) In some embodiments, if reliable delivery of MT DL data is needed, the UE may provide the network with a security protected response to the DL data transmission.

Figure 7:
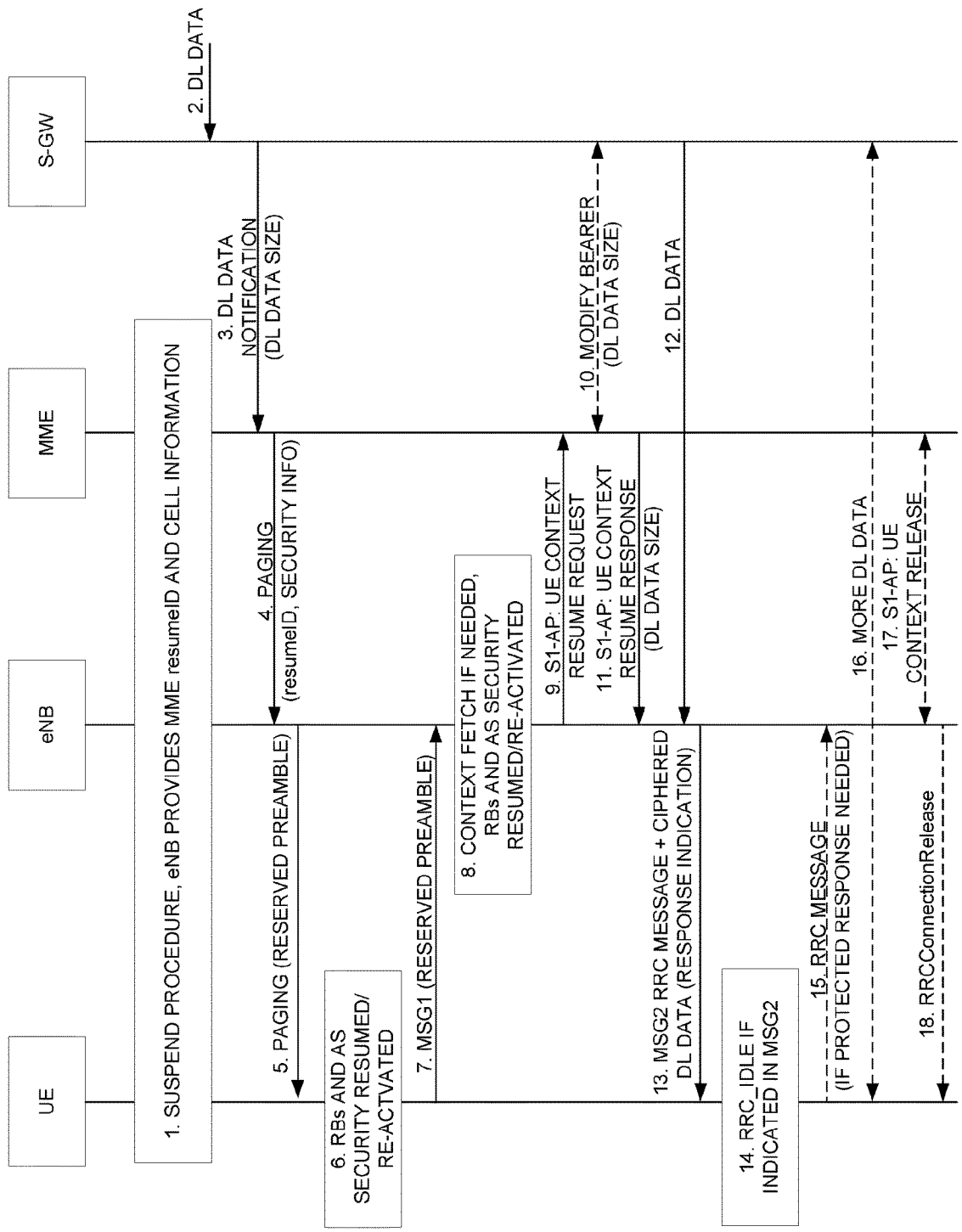
FIG. 7 is a call flow diagram of early data transmission via the user plane according to some embodiments.

Consider first some additional details specifically for MT data with Msg2 for UP-EDT. FIG. 7 shows an example of some embodiments from FIG. 1 where the downlink data 16 is conveyed via the user plane (UP). In particular, FIG. 7 shows a signaling flow for MT DL data in/with Msg2 using CIoT EPS UP optimization. Further details of this example procedure according to this set of embodiments for UP-based MT DL data with Msg2 are provided below.

Step 1: During the suspend procedure, the eNB provides the MME with the UE's resumeID in the S1AP UE Context Suspend Request message. Here, S1AP stands for S1 Application Protocol. The resumeID identifies a suspended RRC connection. In addition to the resumeID, the eNB also provides the MME with information security for the purpose of UE context fetch in case the UE travels to and performs MT EDT at an eNB different from where it was suspended.

In certain embodiments, the UE context fetch procedure is similar to the existing X2 Retrieve UE context procedure so that the target eNB can retrieve UE Access Stratum (AS) context and update AS keys for the transmission of DL data in Msg2. In some embodiments, to allow the target eNB to fetch the context from the source eNB, the security information can be in form of a security token, e.g., calculated in a similar way as the shortResumeMAC-I in the case of connection resume except that the parameter target Cell-ID can be omitted from the input. In some embodiments, the X2 Retrieve UE context procedure is modified to support this new type of context fetch or a new X2 procedure can be specified for this purpose.

In certain embodiments, the context fetch procedure can be specified as follows. The security information may be uploaded to the MME comprising keys or material, which can be used to protect DL data in the target cell in case of MT-EDT. The transmission of Msg2 is performed based on a default configuration and data in Msg2 is protected using provided security material. The UE context may then be fetched and updated after the UE has provided an RRC message in response to Msg2, i.e., Msg3 with a security token, e.g., shortResumeMAC-I. In some embodiments, optionally, a UE AS configuration or context can also be uploaded to the MME and provided to the eNB with the S1-AP paging message, to be used instead of a default configuration. In some embodiments, instead of uploading security information from eNB to MME and MME providing this security information to eNB for protection of DL data and/or for security token purposes, the MME can generate and provide this security information to eNB.

In any event, in Step 2 of FIG. 7, the Serving Gateway (S-GW) receives DL data for the UE. The S-GW in Step 3 transmits a DL data notification to the MME, e.g., which may include an indication of the DL data size. Based on this DL data notification, the MME may determine to initiate an S1 paging procedure. In the S1 paging procedure, once the MME determines that paging is suitable for MT EDT, it includes the resumeID and the security information in a paging message transmitted to the eNB (Step 4). The MME can determine to trigger MT EDT based on the information about DL data size as well as the MT EDT capability of UE. In some embodiments, the DL data size and MT EDT UE capability is indicated to eNB, and eNB determines if MT EDT should be applied for the data transmission. The DL data information may be provided by the S-GW, for example, in the DL data notification procedure. For the MT EDT capability, the UE network capability in the MME UE context may be extended to include the support of MT EDT (which could be transparent to MME in the case of a eNB-controlled solution, but not in the case of a MME-controlled solution).

Upon reception of the S1 paging message, the eNB pages (Step 5) the UE and selects a dedicated contention-free preamble to be included in the paging record of the paging message (in the eNB-controlled solution, the eNB based on the DL data size first determines if MT EDT is suitable in this case). The preamble can be from the existing group of contention-free preamble or a new group for MT EDT can be specified.

In Step 6, upon reception of the paging message from the eNB, the UE re-activates AS security and radio bearers except Signaling Radio Bearer #0 (SRB0). In some embodiments this may be performed after transmitting Msg1.

In Step 7, the UE may then send the eNB a Msg1 transmission with the dedicated preamble provided in the paging record. In case the UE was provided with an NCC value during the preceding suspend procedure, the UE derives AS keys based on this value of NCC.

In Steps 8-11, upon reception of the Msg1, the eNB knows from which UE the preamble was sent from, and thus may use the corresponding resumeID to request the MME to resume the UE context and S1 connection. The eNB may re-activate AS security and resume radio bearers, except SRB0 for the UE. In case the UE was previously suspended from another (source) eNB, the eNB may retrieve the UE context from the source eNB using a context fetch procedure with the resumeID and the security information received from the MME. DL data from the S-GW may then be forwarded to the eNB for transmission (Step 12). The S-GW may inform the MME/eNB of the updated amount of DL data so that it can decide to keep the UE in Idle mode or indicate the UE to continue the resume procedure. This can be done by including the information in one or more of the Modify bearer procedure (Step 10) and the S1-AP UE Context resume procedure (steps 9 and 11).

Having the DL data forwarded from S-GW, the eNB may reactivate AS security and resume RBs for the UE. The DL data may be ciphered and multiplexed with an RRC message in Msg2 to the UE (Step 13). The RRC message may be used to indicate the UE to either remain in Idle mode or continue with the RRC connection for further data transmission(s). In certain embodiments, depending on whether reliable delivery of DL user data is configured or not, the eNB may explicitly indicate/require the UE to send a security protected response.

In certain embodiments, an explicit indication can be included in the RRC message in Msg2 (Step 13). In certain alternative embodiments, the reception of an RRC message in Msg2 can be used as an implicit indication for the UE to send a UP message in response. In some embodiments, the RRC message in Msg2 can be based on existing message with an extension, such as RRCConnectionResume, or a newly defined message with the described functionality. The RRC message may be sent over SRB1 or SRB2 so that the UE can verify the authenticity of the network.

For the legacy RA procedure, the UE may apply Random Access Radio Network Temporary Identity (RA-RNTI) for the monitoring of (N/M)PDCCH (Physical Downlink Control Channel) within the RA-window for the reception of Msg2. In certain embodiments, a UE-specific MT EDT RNTI, here called E-RNTI, may be used instead. The E-RNTI could either be signaled, explicitly or implicitly, as part of the paging record in the paging message, or it could be derived as a function of any combination of the following: the used CF preamble, the UE_ID, the used time- and frequency-resource, etc.

In certain embodiments, the protected response is not needed. The eNB may indicate the UE to either continue with connection resume procedure with an RRC message such as RRCConnectionResume, or fallback to setup a connection from scratch, for example, due to not being able to locate UE context, or release the connection with or without suspend indication.

Upon reception of Msg2, the UE may check the integrity of the RRC message therein using the activated AS security and if this is successful, it may decipher DL user data. The UE may respond accordingly based on the content of the RRC message.

In certain embodiments, it is required to provide a protected response for reliability purposes (Step 15). The UE may send the eNB an UL RRC message over SRB1 or SRB2 in Msg3 for the eNB to verify its authenticity. Alternatively, the UE may send an RRC message over SRB0 in Msg3 and computes a security token, similar to the shortResume-MAC-I used in the case of legacy resume procedure, for the verification at the eNB. The UL RRC message in "Msg3" (step 15) can be based on an existing message with extension, e.g., RRCConnectionResumeRequest/RRCResumeRequest or a new RRC message can be defined for this purpose. In some embodiments, the Radio Link Control (RLC) ACK and/or Hybrid Automatic Repeat Request (HARQ) ACK can be considered as a response to the DL data transmission In certain embodiments, the RRC message in Msg2 indicates that the connection is to be released or suspended. In response, the UE may stay in RRC_IDLE (Step 14) and release/suspend RBs and AS security as well as layer 2 states and entities (i.e., Packet Data Convergence Protocol, PDCP, and RLC). In other embodiments, if the RRC message in Msg2 indicates fallback to legacy connection setup, the UE sends an RRC message, e.g., RRCConnectionSetupComplete to complete the setup procedure.

If the UE sends Msg3 in response to the Msg2 with DL data (irrespective of an UL protected response or not), any further DL and/or UL data transmission can follow (Step 16) before the eNB sends an RRC message (Step 18) to suspend/release the connection, e.g., RRCConnectionRelease w/o suspend indication.

Figure 8:
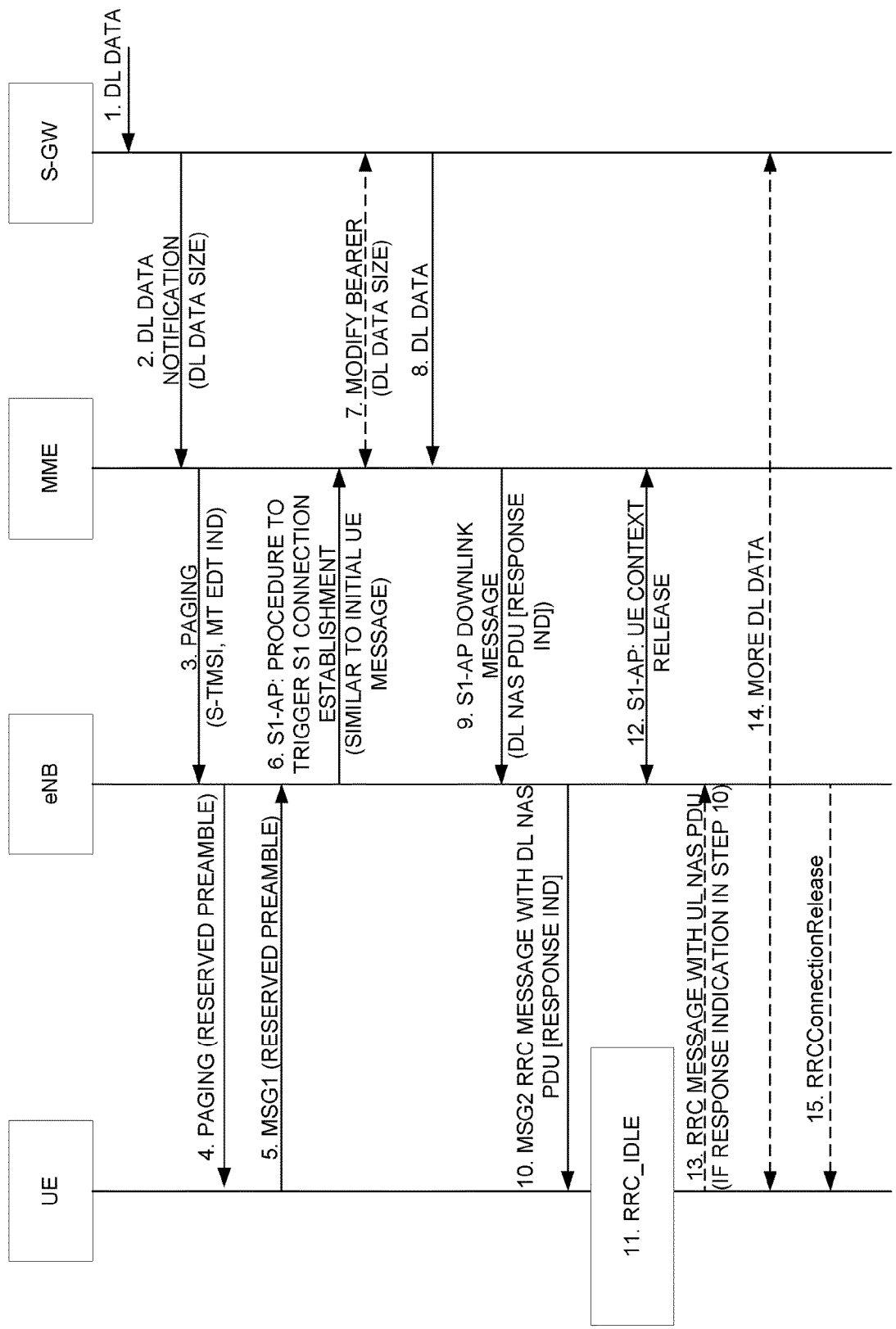
FIG. 8 is a call flow diagram of early data transmission via the control plane according to some embodiments.

Consider now MT data with Msg2 for CP-EDT. FIG. 7 shows an example of some embodiments from FIG. 1 where the downlink data 16 is conveyed via the control plane (CP). In particular, FIG. 8 shows an example of signaling flow for MT DL data in/with Msg2 using CIoT EPS CP optimization. Further details of this example procedure according to this set of embodiments for MT data in Msg2 using UP CIoT optimization are provided below.

Steps 1-5 in FIG. 8 are similar to the case of the example MT UP-EDT embodiments shown in FIG. 7, except that the eNB and MME may not need to store and exchange the resumeID and security information. Instead, in certain embodiments, the S-TMST is used as UE identity.

In Step 3, once the MME determined that the paging is for MT CP EDT, the MME may include a MT (CP) EDT indication in the paging message. Similar to MT U-EDT, the MME may determine the trigger of MT CP-EDT based on the information about DL data size provided by the S-GW/SCEF and/or the MT CP-EDT capability of UE extracted from the UE network capability in the MME UE context.

In Step 4, the eNB may page the UE and select a dedicated contention-free preamble to be included in the paging record of the paging message. The preamble can be from the existing group of contention-free preambles or a new group for MT EDT can be specified.

Certain reliability issues may arise with respect to this aspect in MT CP-EDT. For example, any UE with the reserved contention-free preamble can respond the eNB in Msg1 and receive DL data in Msg2, e.g., the network may send DL data to unintended UEs. To limit/reduce the unintended reception of DL data, in certain embodiments, the UE and MME can have a mechanism to encode the reserved preamble so that other UEs cannot read it. In some embodiments, this can be done by modifying the preamble using for example XOR operation with a parameter, which can only be calculated by the MME and the UE. The MME may include this parameter in the S1 paging message and the eNB may use this parameter to perform the predefined operation, e.g., XOR in this example. In some embodiments, the contention free (CF) preamble is determined as function of the NAS security token or other information not known by a third party UE.

In Step 5, upon reception of the paging message from the eNB, the UE may then send the eNB a Msg1 with the dedicated preamble provided in the paging record.

Upon reception of the Msg1, the eNB may associate the received preamble with the corresponding S-TMSI of the UE to request the MME to establish connection (Step 6). DL data from the S-GW/SCEF may then be forwarded to the MME (Step 8). In some embodiments, the S-GW/SCEF can inform the MME/eNB the updated amount of DL data via the Modify bearer procedure (step 7). In certain embodiments, the establishment of S1 connection can be done as follows. The S1-AP Initial UE message is performed upon the eNB receiving the reserved preamble from the UE associated with the S-TMSI and the MT EDT indication in the S1 paging message. Alternatively, a new S1-AP procedure is defined to trigger the establishment of S1 connection based on the S-TMSI.

At step 9, the MME may form a NAS message containing DL data, which is protected with NAS security to be sent to the UE in a S1-AP DL message, e.g., DL NAS TRANSPORT or CONNECTION ESTABLISHMENT INDICATION. In some embodiments, depending on whether reliable delivery of DL user data is configured or not, the MME may explicitly indicate in the NAS message that the UE is required to send a security protected response. In other alternative embodiments, the reception of a specific DL NAS message can be an implicit indication for the protected response.

At step 10, the eNB may forward the protected DL NAS message with DL data to the UE in a RRC message in Msg2. The RRC message in Msg2 can be based on existing message, e.g., RRCEarlyDataComplete or a newly defined message with the described functionality. The RRC message is sent over SRB0.

For the legacy RA procedure, the UE may apply RA-RNTI for the monitoring of (N/M)PDCCH within the RA-window for the reception of Msg2. In certain embodiments, a UE-specific MT EDT RNTI, here called E-RNTI, is instead used. The E-RNTI could either be signaled, explicitly or implicitly, as part of the paging record in the paging message, or it could be derived as a function of any combination of the following: the used CF preamble, the UE_ID, the used time- and frequency-resource, etc.

At steps 11-16, upon reception of Msg2, the UE may check the NAS integrity of the DL NAS message if this is successful, it may decipher DL user data. The UE may act accordingly to the content of Msg2.

In particular, in case it is indicated in the NAS message that the UE needs to provide a protected response for reliability purposes, the UE in some embodiments sends a protected UL NAS message to the MME for its verification of the UE's authenticity. The UL NAS message can be any existing integrity protected UL NAS message, e.g., SERVICE REQUEST, CP SERVICE REQUEST. In certain embodiments, for further reduced of signaling overhead, a new and small size NAS message can be defined for this purpose. The UL NAS message can be carried by a RRC message in Msg3 in response to the Msg2. Existing RRC message, e.g., RRCEarlyDataRequest can be used or a new message can be defined for this purpose. In some embodiments, the UE and the network can compute and exchange/verify a security token I either at AS or NAS layer, similar to the shortResumeMAC- used in the case of legacy resume procedure. For example, the UL RRC message in "Msg3" (Step 13) can be based on an existing message with extension, e.g., RRCEarlyDataRequest or RRCConnectionRequest or a new RRC message can be defined for this purpose. In some embodiments, the RLC ACK and/or HARQ ACK can be considered as a response to the DL data transmission In the case the protected response is not needed, depending on the content of RRC message in Msg2, the UE can be indicated to either stay in RRC_IDLE or fallback to legacy connection setup, e.g., sending the eNB an RRCConnectionSetupComplete to complete the setup procedure.

If the UE sends Msg3 in response to the Msg2 with DL data (irrespective of UL protected response or not), any further DL and/or UL data transmission can follow before the eNB send an RRC message to release the connection, e.g., RRCConnectionRelease.

In this manner, this disclosure has provided example embodiments providing solutions to the above-described problems with early data transmission for mobile-terminated downlink data. For example, certain embodiments allow for the transmission of MT EDT data during Msg2 during contention free random access. FIGS. 7 and 8 provide illustrated signaling diagrams for example embodiments for EDT with Msg2 in user plane and control plane environments, respectively.

Figure 9:
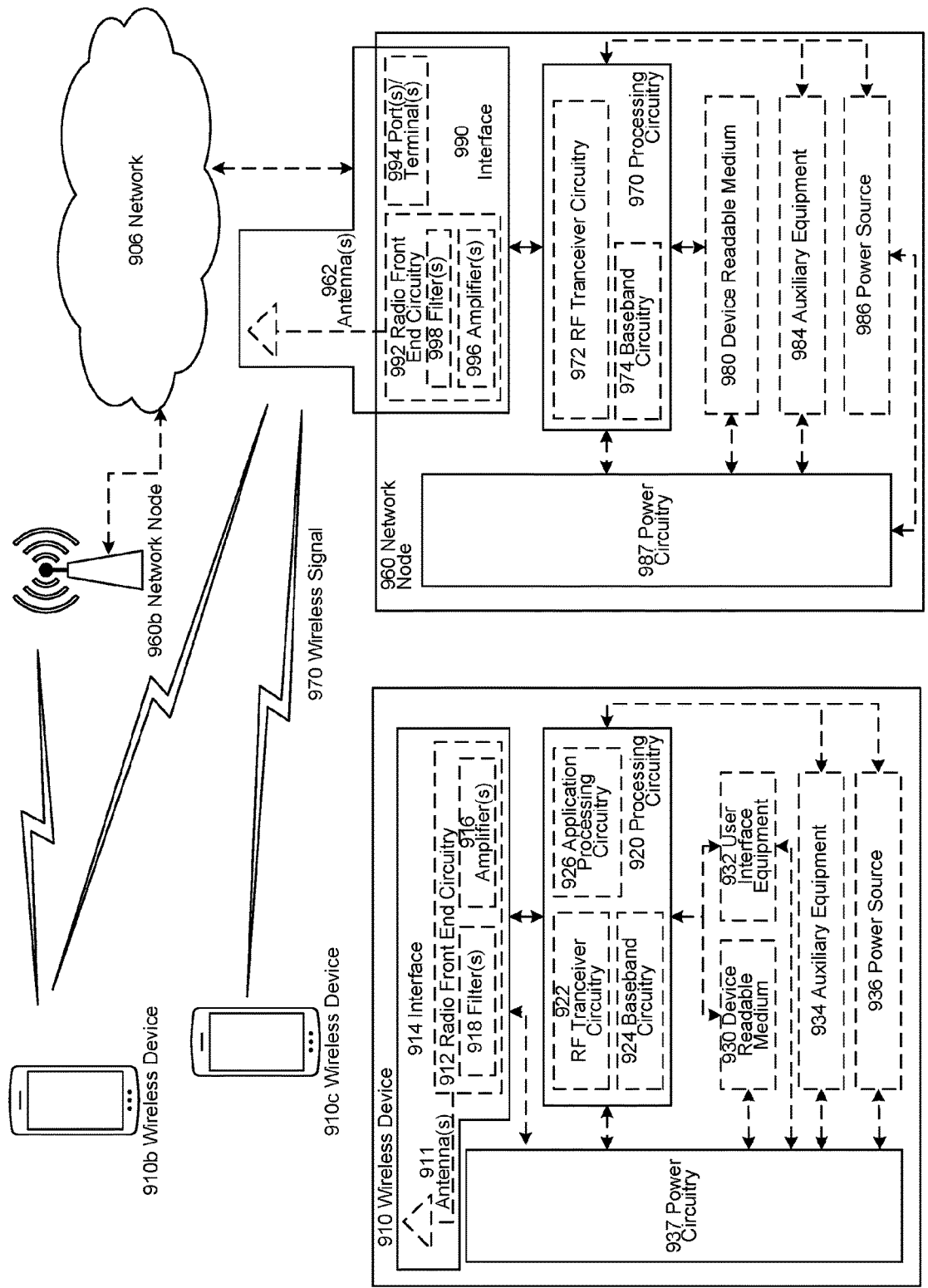
FIG. 9 is a block diagram of a wireless communication network according to some embodiments.

Although the subject matter described herein may be implemented in any appropriate type of system using any suitable component, the embodiments disclosed herein are described in relation to a wireless network, such as the example wireless network illustrated in FIG. 9. For simplicity, the wireless network of FIG. 9 only depicts network 906, network nodes 960 and 960*b*, and WDs 910, 910*b*, and 910*c*. In practice, a wireless network may further include any additional elements suitable to support communication between wireless devices or between a wireless device and another communication device, such as a landline telephone, a service provider, or any other network node or end device. Of the illustrated components, network node 960 and wireless device (WD) 910 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 906 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 960 and WD 910 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 9, network node 960 includes processing circuitry 970, device readable medium 980, interface 990, auxiliary equipment 984, power source 986, power circuitry 987, and antenna 962. Although network node 960 illustrated in the example wireless network of FIG. 9 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 960 are depicted as single boxes located within a larger box, or nested within multiple boxes, in practice, a network node may comprise multiple different physical components that make up a single illustrated component (e.g., device readable medium 980 may comprise multiple separate hard drives as well as multiple RAM modules).

Similarly, network node 960 may be composed of multiple physically separate components (e.g., a NodeB component and a RNC component, or a BTS component and a BSC component, etc.), which may each have their own respective components. In certain scenarios in which network node 960 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 960 may be configured to support multiple radio access technologies (RATs). In such embodiments, some components may be duplicated (e.g., separate device readable medium 980 for the different RATs) and some components may be reused (e.g., the same antenna 962 may be shared by the RATs). Network node 960 may also include multiple sets of the various illustrated components for different wireless technologies integrated into network node 960, such as, for example, GSM, WCDMA, LTE, NR, WiFi, or Bluetooth wireless technologies. These wireless technologies may be integrated into the same or different chip or set of chips and other components within network node 960.

Processing circuitry 970 is configured to perform any determining, calculating, or similar operations (e.g., certain obtaining operations) described herein as being provided by a network node. These operations performed by processing circuitry 970 may include processing information obtained by processing circuitry 970 by, for example, converting the obtained information into other information, comparing the obtained information or converted information to information stored in the network node, and/or performing one or more operations based on the obtained information or converted information, and as a result of said processing making a determination.

Processing circuitry 970 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 960 components, such as device readable medium 980, network node 960 functionality. For example, processing circuitry 970 may execute instructions stored in device readable medium 980 or in memory within processing circuitry 970. Such functionality may include providing any of the various wireless features, functions, or benefits discussed herein. In some embodiments, processing circuitry 970 may include a system on a chip (SOC).

In some embodiments, processing circuitry 970 may include one or more of radio frequency (RF) transceiver circuitry 972 and baseband processing circuitry 974. In some embodiments, radio frequency (RF) transceiver circuitry 972 and baseband processing circuitry 974 may be on separate chips (or sets of chips), boards, or units, such as radio units and digital units. In alternative embodiments, part or all of RF transceiver circuitry 972 and baseband processing circuitry 974 may be on the same chip or set of chips, boards, or units In certain embodiments, some or all of the functionality described herein as being provided by a network node, base station, eNB or other such network device may be performed by processing circuitry 970 executing instructions stored on device readable medium 980 or memory within processing circuitry 970. In alternative embodiments, some or all of the functionality may be provided by processing circuitry 970 without executing instructions stored on a separate or discrete device readable medium, such as in a hard-wired manner. In any of those embodiments, whether executing instructions stored on a device readable storage medium or not, processing circuitry 970 can be configured to perform the described functionality. The benefits provided by such functionality are not limited to processing circuitry 970 alone or to other components of network node 960, but are enjoyed by network node 960 as a whole, and/or by end users and the wireless network generally.

Device readable medium 980 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 970. Device readable medium 980 may store any suitable instructions, data or information, including a computer program, software, an application including one or more of logic, rules, code, tables, etc. and/or other instructions capable of being executed by processing circuitry 970 and, utilized by network node 960. Device readable medium 980 may be used to store any calculations made by processing circuitry 970 and/or any data received via interface 990. In some embodiments, processing circuitry 970 and device readable medium 980 may be considered to be integrated.

Interface 990 is used in the wired or wireless communication of signalling and/or data between network node 960, network 906, and/or WDs 910. As illustrated, interface 990 comprises port(s)/terminal(s) 994 to send and receive data, for example to and from network 906 over a wired connection. Interface 990 also includes radio front end circuitry 992 that may be coupled to, or in certain embodiments a part of, antenna 962. Radio front end circuitry 992 comprises filters 998 and amplifiers 996. Radio front end circuitry 992 may be connected to antenna 962 and processing circuitry 970. Radio front end circuitry may be configured to condition signals communicated between antenna 962 and processing circuitry 970. Radio front end circuitry 992 may receive digital data that is to be sent out to other network nodes or WDs via a wireless connection. Radio front end circuitry 992 may convert the digital data into a radio signal having the appropriate channel and bandwidth parameters using a combination of filters 998 and/or amplifiers 996. The radio signal may then be transmitted via antenna 962. Similarly, when receiving data, antenna 962 may collect radio signals which are then converted into digital data by radio front end circuitry 992. The digital data may be passed to processing circuitry 970. In other embodiments, the interface may comprise different components and/or different combinations of components.

In certain alternative embodiments, network node 960 may not include separate radio front end circuitry 992, instead, processing circuitry 970 may comprise radio front end circuitry and may be connected to antenna 962 without separate radio front end circuitry 992. Similarly, in some embodiments, all or some of RF transceiver circuitry 972 may be considered a part of interface 990. In still other embodiments, interface 990 may include one or more ports or terminals 994, radio front end circuitry 992, and RF transceiver circuitry 972, as part of a radio unit (not shown), and interface 990 may communicate with baseband processing circuitry 974, which is part of a digital unit (not shown).

Antenna 962 may include one or more antennas, or antenna arrays, configured to send and/or receive wireless signals. Antenna 962 may be coupled to radio front end circuitry 990 and may be any type of antenna capable of transmitting and receiving data and/or signals wirelessly. In some embodiments, antenna 962 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 962 may be separate from network node 960 and may be connectable to network node 960 through an interface or port.

Antenna 962, interface 990, and/or processing circuitry 970 may be configured to perform any receiving operations and/or certain obtaining operations described herein as being performed by a network node. Any information, data and/or signals may be received from a wireless device, another network node and/or any other network equipment. Similarly, antenna 962, interface 990, and/or processing circuitry 970 may be configured to perform any transmitting operations described herein as being performed by a network node. Any information, data and/or signals may be transmitted to a wireless device, another network node and/or any other network equipment.

Power circuitry 987 may comprise, or be coupled to, power management circuitry and is configured to supply the components of network node 960 with power for performing the functionality described herein. Power circuitry 987 may receive power from power source 986. Power source 986 and/or power circuitry 987 may be configured to provide power to the various components of network node 960 in a form suitable for the respective components (e.g., at a voltage and current level needed for each respective component). Power source 986 may either be included in, or external to, power circuitry 987 and/or network node 960. For example, network node 960 may be connectable to an external power source (e.g., an electricity outlet) via an input circuitry or interface such as an electrical cable, whereby the external power source supplies power to power circuitry 987. As a further example, power source 986 may comprise a source of power in the form of a battery or battery pack which is connected to, or integrated in, power circuitry 987.

The battery may provide backup power should the external power source fail. Other types of power sources, such as photovoltaic devices, may also be used.

Alternative embodiments of network node 960 may include additional components beyond those shown in FIG. 9 that may be responsible for providing certain aspects of the network node's functionality, including any of the functionality described herein and/or any functionality necessary to support the subject matter described herein. For example, network node 960 may include user interface equipment to allow input of information into network node 960 and to allow output of information from network node 960. This may allow a user to perform diagnostic, maintenance, repair, and other administrative functions for network node 960.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (I) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 910 includes antenna 911, interface 914, processing circuitry 920, device readable medium 930, user interface equipment 932, auxiliary equipment 934, power source 936 and power circuitry 937. WD 910 may include multiple sets of one or more of the illustrated components for different wireless technologies supported by WD 910, such as, for example, GSM, WCDMA, LTE, NR, WiFi, WiMAX, or Bluetooth wireless technologies, just to mention a few. These wireless technologies may be integrated into the same or different chips or set of chips as other components within WD 910.

Antenna 911 may include one or more antennas or antenna arrays, configured to send and/or receive wireless signals, and is connected to interface 914. In certain alternative embodiments, antenna 911 may be separate from WD 910 and be connectable to WD 910 through an interface or port. Antenna 911, interface 914, and/or processing circuitry 920 may be configured to perform any receiving or transmitting operations described herein as being performed by a WD. Any information, data and/or signals may be received from a network node and/or another WD. In some embodiments, radio front end circuitry and/or antenna 911 may be considered an interface.

As illustrated, interface 914 comprises radio front end circuitry 912 and antenna 911. Radio front end circuitry 912 comprise one or more filters 918 and amplifiers 916. Radio front end circuitry 914 is connected to antenna 911 and processing circuitry 920, and is configured to condition signals communicated between antenna 911 and processing circuitry 920. Radio front end circuitry 912 may be coupled to or a part of antenna 911. In some embodiments, WD 910 may not include separate radio front end circuitry 912; rather, processing circuitry 920 may comprise radio front end circuitry and may be connected to antenna 911. Similarly, in some embodiments, some or all of RF transceiver circuitry 922 may be considered a part of interface 914. Radio front end circuitry 912 may receive digital data that is to be sent out to other network nodes or WDs via a wireless connection. Radio front end circuitry 912 may convert the digital data into a radio signal having the appropriate channel and bandwidth parameters using a combination of filters 918 and/or amplifiers 916. The radio signal may then be transmitted via antenna 911. Similarly, when receiving data, antenna 911 may collect radio signals which are then converted into digital data by radio front end circuitry 912. The digital data may be passed to processing circuitry 920. In other embodiments, the interface may comprise different components and/or different combinations of components.

Processing circuitry 920 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 910 components, such as device readable medium 930, WD 910 functionality. Such functionality may include providing any of the various wireless features or benefits discussed herein. For example, processing circuitry 920 may execute instructions stored in device readable medium 930 or in memory within processing circuitry 920 to provide the functionality disclosed herein.

As illustrated, processing circuitry 920 includes one or more of RF transceiver circuitry 922, baseband processing circuitry 924, and application processing circuitry 926. In other embodiments, the processing circuitry may comprise different components and/or different combinations of components. In certain embodiments processing circuitry 920 of WD 910 may comprise a SOC. In some embodiments, RF transceiver circuitry 922, baseband processing circuitry 924, and application processing circuitry 926 may be on separate chips or sets of chips. In alternative embodiments, part or all of baseband processing circuitry 924 and application processing circuitry 926 may be combined into one chip or set of chips, and RF transceiver circuitry 922 may be on a separate chip or set of chips. In still alternative embodiments, part or all of RF transceiver circuitry 922 and baseband processing circuitry 924 may be on the same chip or set of chips, and application processing circuitry 926 may be on a separate chip or set of chips. In yet other alternative embodiments, part or all of RF transceiver circuitry 922, baseband processing circuitry 924, and application processing circuitry 926 may be combined in the same chip or set of chips. In some embodiments, RF transceiver circuitry 922 may be apart of interface 914. RF transceiver circuitry 922 may condition RF signals for processing circuitry 920.

In certain embodiments, some or all of the functionality described herein as being performed by a WD may be provided by processing circuitry 920 executing instructions stored on device readable medium 930, which in certain embodiments may be a computer-readable storage medium. In alternative embodiments, some or all of the functionality may be provided by processing circuitry 920 without executing instructions stored on a separate or discrete device readable storage medium, such as in a hard-wired manner. In any of those particular embodiments, whether executing instructions stored on a device readable storage medium or not, processing circuitry 920 can be configured to perform the described functionality. The benefits provided by such functionality are not limited to processing circuitry 920 alone or to other components of WD 910, but are enjoyed by WD 910 as a whole, and/or by end users and the wireless network generally.

Processing circuitry 920 may be configured to perform any determining, calculating, or similar operations (e.g., certain obtaining operations) described herein as being performed by a WD. These operations, as performed by processing circuitry 920, may include processing information obtained by processing circuitry 920 by, for example, converting the obtained information into other information, comparing the obtained information or converted information to information stored by WD 910, and/or performing one or more operations based on the obtained information or converted information, and as a result of said processing making a determination.

Device readable medium 930 may be operable to store a computer program, software, an application including one or more of logic, rules, code, tables, etc. and/or other instructions capable of being executed by processing circuitry 920. Device readable medium 930 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 920. In some embodiments, processing circuitry 920 and device readable medium 930 may be considered to be integrated.

User interface equipment 932 may provide components that allow for a human user to interact with WD 910. Such interaction may be of many forms, such as visual, audial, tactile, etc. User interface equipment 932 may be operable to produce output to the user and to allow the user to provide input to WD 910. The type of interaction may vary depending on the type of user interface equipment 932 installed in WD 910. For example, if WD 910 is a smart phone, the interaction may be via a touch screen; if WD 910 is a smart meter, the interaction may be through a screen that provides usage (e.g., the number of gallons used) or a speaker that provides an audible alert (e.g., if smoke is detected). User interface equipment 932 may include input interfaces, devices and circuits, and output interfaces, devices and circuits. User interface equipment 932 is configured to allow input of information into WD 910, and is connected to processing circuitry 920 to allow processing circuitry 920 to process the input information. User interface equipment 932 may include, for example, a microphone, a proximity or other sensor, keys/buttons, a touch display, one or more cameras, a USB port, or other input circuitry. User interface equipment 932 is also configured to allow output of information from WD 910, and to allow processing circuitry 920 to output information from WD 910. User interface equipment 932 may include, for example, a speaker, a display, vibrating circuitry, a USB port, a headphone interface, or other output circuitry. Using one or more input and output interfaces, devices, and circuits, of user interface equipment 932, WD 910 may communicate with end users and/or the wireless network, and allow them to benefit from the functionality described herein.

Auxiliary equipment 934 is operable to provide more specific functionality which may not be generally performed by WDs. This may comprise specialized sensors for doing measurements for various purposes, interfaces for additional types of communication such as wired communications etc. The inclusion and type of components of auxiliary equipment 934 may vary depending on the embodiment and/or scenario.

Power source 936 may, in some embodiments, be in the form of a battery or battery pack. Other types of power sources, such as an external power source (e.g., an electricity outlet), photovoltaic devices or power cells, may also be used. WD 910 may further comprise power circuitry 937 for delivering power from power source 936 to the various parts of WD 910 which need power from power source 936 to carry out any functionality described or indicated herein. Power circuitry 937 may in certain embodiments comprise power management circuitry. Power circuitry 937 may additionally or alternatively be operable to receive power from an external power source; in which case WD 910 may be connectable to the external power source (such as an electricity outlet) via input circuitry or an interface such as an electrical power cable. Power circuitry 937 may also in certain embodiments be operable to deliver power from an external power source to power source 936. This may be, for example, for the charging of power source 936. Power circuitry 937 may perform any formatting, converting, or other modification to the power from power source 936 to make the power suitable for the respective components of WD 910 to which power is supplied.

Figure 10:
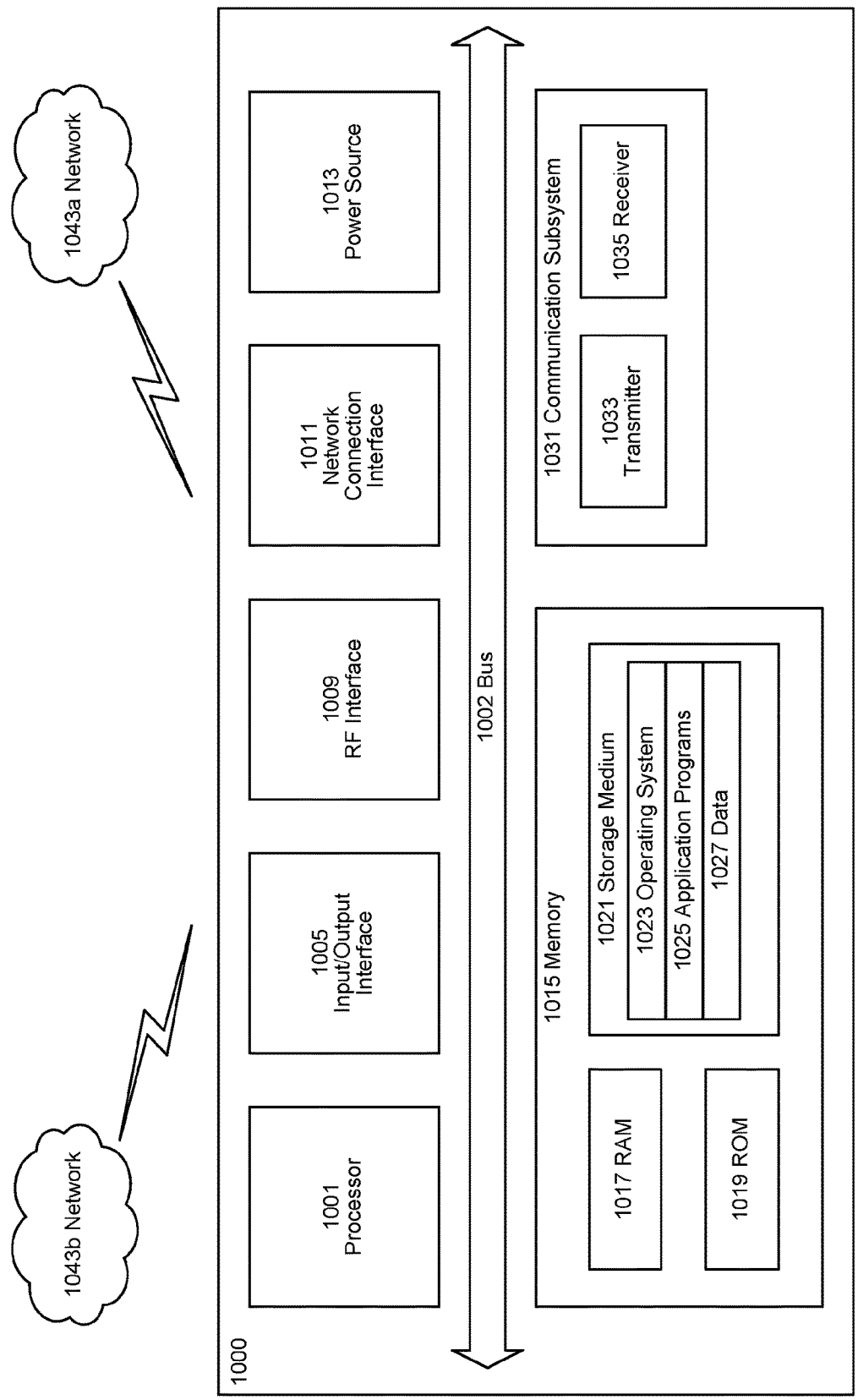
FIG. 10 is a block diagram of a user equipment according to some embodiments.

FIG. 10 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 10200 may be any UE identified by the 3'

Generation Partnership Project (3GPP), including a NB-IoT UE, a machine type communication (MTC) UE, and/or an enhanced MTC (eMTC) UE. UE 1000, as illustrated in FIG. 10, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 10 is a UE, the components discussed herein are equally applicable to a WD, and vice-versa.

In FIG. 10, UE 1000 includes processing circuitry 1001 that is operatively coupled to input/output interface 1005, radio frequency (RF) interface 1009, network connection interface 1011, memory 1015 including random access memory (RAM) 1017, read-only memory (ROM) 1019, and storage medium 1021 or the like, communication subsystem 1031, power source 1033, and/or any other component, or any combination thereof. Storage medium 1021 includes operating system 1023, application program 1025, and data 1027. In other embodiments, storage medium 1021 may include other similar types of information. Certain UEs may utilize all of the components shown in FIG. 10, or only a subset of the components. The level of integration between the components may vary from one UE to another UE. Further, certain UEs may contain multiple instances of a component, such as multiple processors, memories, transceivers, transmitters, receivers, etc.

In FIG. 10, processing circuitry 1001 may be configured to process computer instructions and data. Processing circuitry 1001 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1001 may include two central processing units (CPUs). Data may be information in a form suitable for use by a computer.

In the depicted embodiment, input/output interface 1005 may be configured to provide a communication interface to an input device, output device, or input and output device. UE 1000 may be configured to use an output device via input/output interface 1005. An output device may use the same type of interface port as an input device. For example, a USB port may be used to provide input to and output from UE 1000. The output device may be a speaker, a sound card, a video card, a display, a monitor, a printer, an actuator, an emitter, a smartcard, another output device, or any combination thereof. UE 1000 may be configured to use an input device via input/output interface 1005 to allow a user to capture information into UE 1000. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 10, RF interface 1009 may be configured to provide a communication interface to RF components such as a transmitter, a receiver, and an antenna. Network connection interface 1011 may be configured to provide a communication interface to network 1043*a*. Network 1043*a* may encompass wired and/or wireless networks such as a local-area network (LAN), a wide-area network (WAN), a computer network, a wireless network, a telecommunications network, another like network or any combination thereof. For example, network 1043*a* may comprise a Wi-Fi network. Network connection interface 1011 may be configured to include a receiver and a transmitter interface used to communicate with one or more other devices over a communication network according to one or more communication protocols, such as Ethernet, TCP/IP, SONET, ATM, or the like. Network connection interface 1011 may implement receiver and transmitter functionality appropriate to the communication network links (e.g., optical, electrical, and the like). The transmitter and receiver functions may share circuit components, software or firmware, or alternatively may be implemented separately.

RAM 1017 may be configured to interface via bus 1002 to processing circuitry 1001 to provide storage or caching of data or computer instructions during the execution of software programs such as the operating system, application programs, and device drivers. ROM 1019 may be configured to provide computer instructions or data to processing circuitry 1001. For example, ROM 1019 may be configured to store invariant low-level system code or data for basic system functions such as basic input and output (I/O), startup, or reception of keystrokes from a keyboard that are stored in a non-volatile memory. Storage medium 1021 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1021 may be configured to include operating system 1023, application program 1025 such as a web browser application, a widget or gadget engine or another application, and data file 1027. Storage medium 1021 may store, for use by UE 1000, any of a variety of various operating systems or combinations of operating systems.

Storage medium 1021 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1021 may allow UE 1000 to access computer-executable instructions, application programs or the like, stored on transitory or non-transitory memory media, to off-load data, or to upload data. An article of manufacture, such as one utilizing a communication system may be tangibly embodied in storage medium 1021, which may comprise a device readable medium.

In FIG. 10, processing circuitry 1001 may be configured to communicate with network 1043*b* using communication subsystem 1031. Network 1043*a* and network 1043*b* may be the same network or networks or different network or networks. Communication subsystem 1031 may be configured to include one or more transceivers used to communicate with network 1043*b*. For example, communication subsystem 1031 may be configured to include one or more transceivers used to communicate with one or more remote transceivers of another device capable of wireless communication such as another WD, UE, or base station of a radio access network (RAN) according to one or more communication protocols, such as IEEE 802.10, CDMA, WCDMA, GSM, LTE, UTRAN, WiMax, or the like. Each transceiver may include transmitter 1033 and/or receiver 1035 to implement transmitter or receiver functionality, respectively, appropriate to the RAN links (e.g., frequency allocations and the like). Further, transmitter 1033 and receiver 1035 of each transceiver may share circuit components, software or firmware, or alternatively may be implemented separately.

In the illustrated embodiment, the communication functions of communication subsystem 1031 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1031 may include cellular communication, Wi-Fi communication, Bluetooth communication, and GPS communication. Network 1043*b* may encompass wired and/or wireless networks such as a local-area network (LAN), a wide-area network (WAN), a computer network, a wireless network, a telecommunications network, another like network or any combination thereof. For example, network 1043*b* may be a cellular network, a Wi-Fi network, and/or a near-field network. Power source 1013 may be configured to provide alternating current (AC) or direct current (DC) power to components of UE 1000.

The features, benefits and/or functions described herein may be implemented in one of the components of UE 1000 or partitioned across multiple components of UE 1000. Further, the features, benefits, and/or functions described herein may be implemented in any combination of hardware, software or firmware. In one example, communication subsystem 1031 may be configured to include any of the components described herein. Further, processing circuitry 1001 may be configured to communicate with any of such components over bus 1002. In another example, any of such components may be represented by program instructions stored in memory that when executed by processing circuitry 1001 perform the corresponding functions described herein. In another example, the functionality of any of such components may be partitioned between processing circuitry 1001 and communication subsystem 1031. In another example, the non-computationally intensive functions of any of such components may be implemented in software or firmware and the computationally intensive functions may be implemented in hardware.

Figure 11:
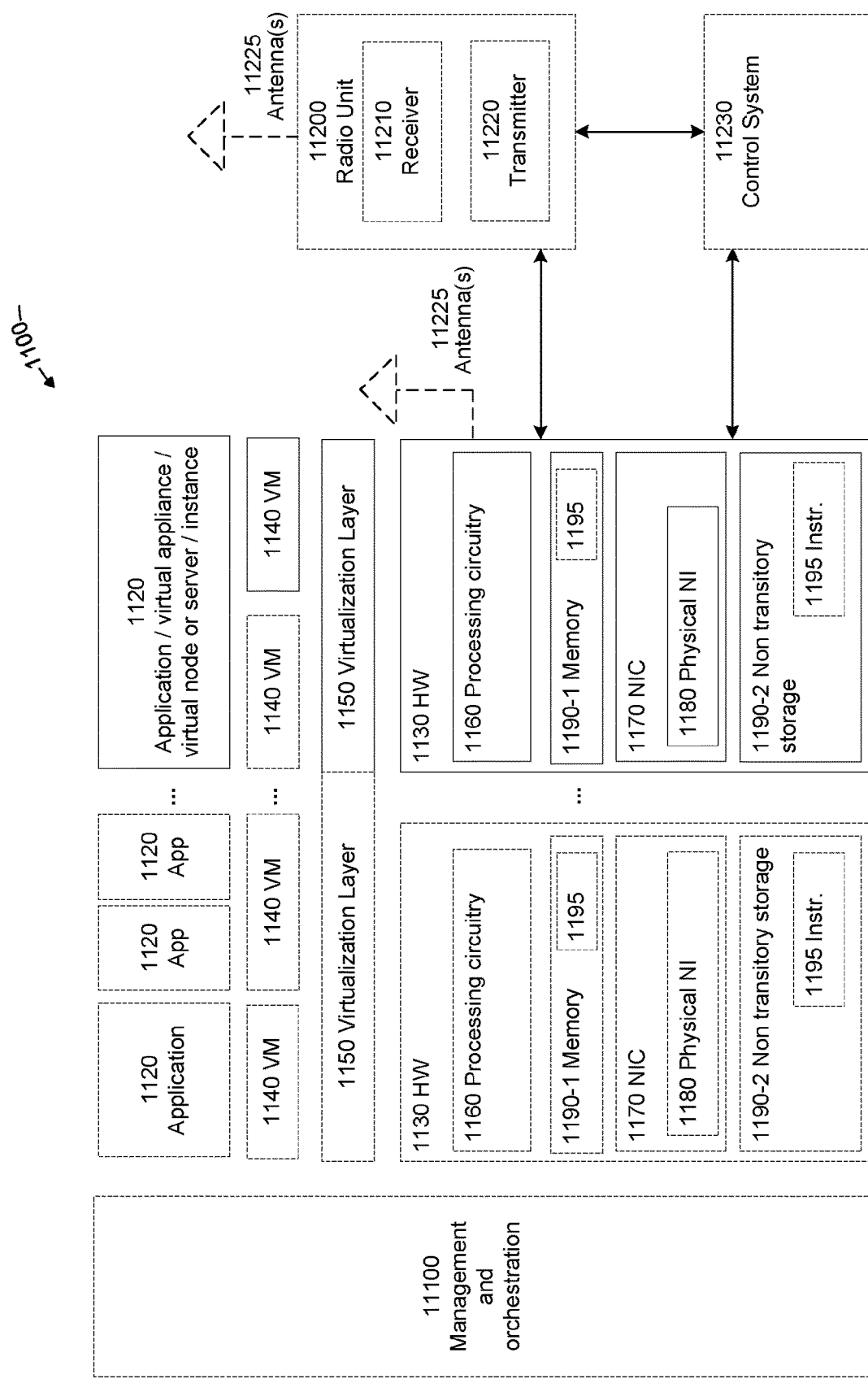
FIG. 11 is a block diagram of a virtualization environment according to some embodiments.

FIG. 11 is a schematic block diagram illustrating a virtualization environment 1100 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1100 hosted by one or more of hardware nodes 1130. Further, in embodiments in which the virtual node is not a radio access node or does not require radio connectivity (e.g., a core network node), then the network node may be entirely virtualized.

The functions may be implemented by one or more applications 1120 (which may alternatively be called software instances, virtual appliances, network functions, virtual nodes, virtual network functions, etc.) operative to implement some of the features, functions, and/or benefits of some of the embodiments disclosed herein. Applications 1120 are run in virtualization environment 1100 which provides hardware 1130 comprising processing circuitry 1160 and memory 1190. Memory 1190 contains instructions 1195 executable by processing circuitry 1160 whereby application 1120 is operative to provide one or more of the features, benefits, and/or functions disclosed herein.

Virtualization environment 1100, comprises general-purpose or special-purpose network hardware devices 1130 comprising a set of one or more processors or processing circuitry 1160, which may be commercial off-the-shelf (COTS) processor, dedicated Application Specific Integrated Circuits (ASICs), or any other type of processing circuitry including digital or analog hardware components or special purpose processors. Each hardware device may comprise memory 1190-1 which may be non-persistent memory for temporarily storing instructions 1195 or software executed by processing circuitry 1160. Each hardware device may comprise one or more network interface controllers (NICs) 1170, also known as network interface cards, which include physical network interface 1180. Each hardware device may also include non-transitory, persistent, machine-readable storage media 1190-2 having stored therein software 1195 and/or instructions executable by processing circuitry 1160. Software 1195 may include any type of software including software for instantiating one or more virtualization layers 1150 (also referred to as hypervisors), software to execute virtual machines 1140 as well as software allowing it to execute functions, features and/or benefits described in relation with some embodiments described herein.

Virtual machines 1140, comprise virtual processing, virtual memory, virtual networking or interface and virtual storage, and may be run by a corresponding virtualization layer 1150 or hypervisor. Different embodiments of the instance of virtual appliance 1120 may be implemented on one or more of virtual machines 1140, and the implementations may be made in different ways.

During operation, processing circuitry 1160 executes software 1195 to instantiate the hypervisor or virtualization layer 1150, which may sometimes be referred to as a virtual machine monitor (VMM). Virtualization layer 1150 may present a virtual operating platform that appears like networking hardware to virtual machine 1140.

As shown in FIG. 11, hardware 1130 may be a standalone network node with generic or specific components. Hardware 1130 may comprise antenna 11225 and may implement some functions via virtualization. Alternatively, hardware 1130 may be part of a larger cluster of hardware (e.g. such as in a data center or customer premise equipment (CPE)) where many hardware nodes work together and are managed via management and orchestration (MANO) 11100, which, among others, oversees lifecycle management of applications 1120.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1140 may be a software implementation of a physical machine that runs programs as if they were executing on a physical, non-virtualized machine. Each of virtual machines 1140, and that part of hardware 1130 that executes that virtual machine, be it hardware dedicated to that virtual machine and/or hardware shared by that virtual machine with others of the virtual machines 1140, forms a separate virtual network elements (VNE).

Still in the context of NFV, Virtual Network Function (VNF) is responsible for handling specific network functions that run in one or more virtual machines 1140 on top of hardware networking infrastructure 1130 and corresponds to application 1120 in FIG. 11.

In some embodiments, one or more radio units 11200 that each include one or more transmitters 11220 and one or more receivers 11210 may be coupled to one or more antennas 11225. Radio units 11200 may communicate directly with hardware nodes 1130 via one or more appropriate network interfaces and may be used in combination with the virtual components to provide a virtual node with radio capabilities, such as a radio access node or a base station.

In some embodiments, some signalling can be effected with the use of control system 11230 which may alternatively be used for communication between the hardware nodes 1130 and radio units 11200.

Figure 12:
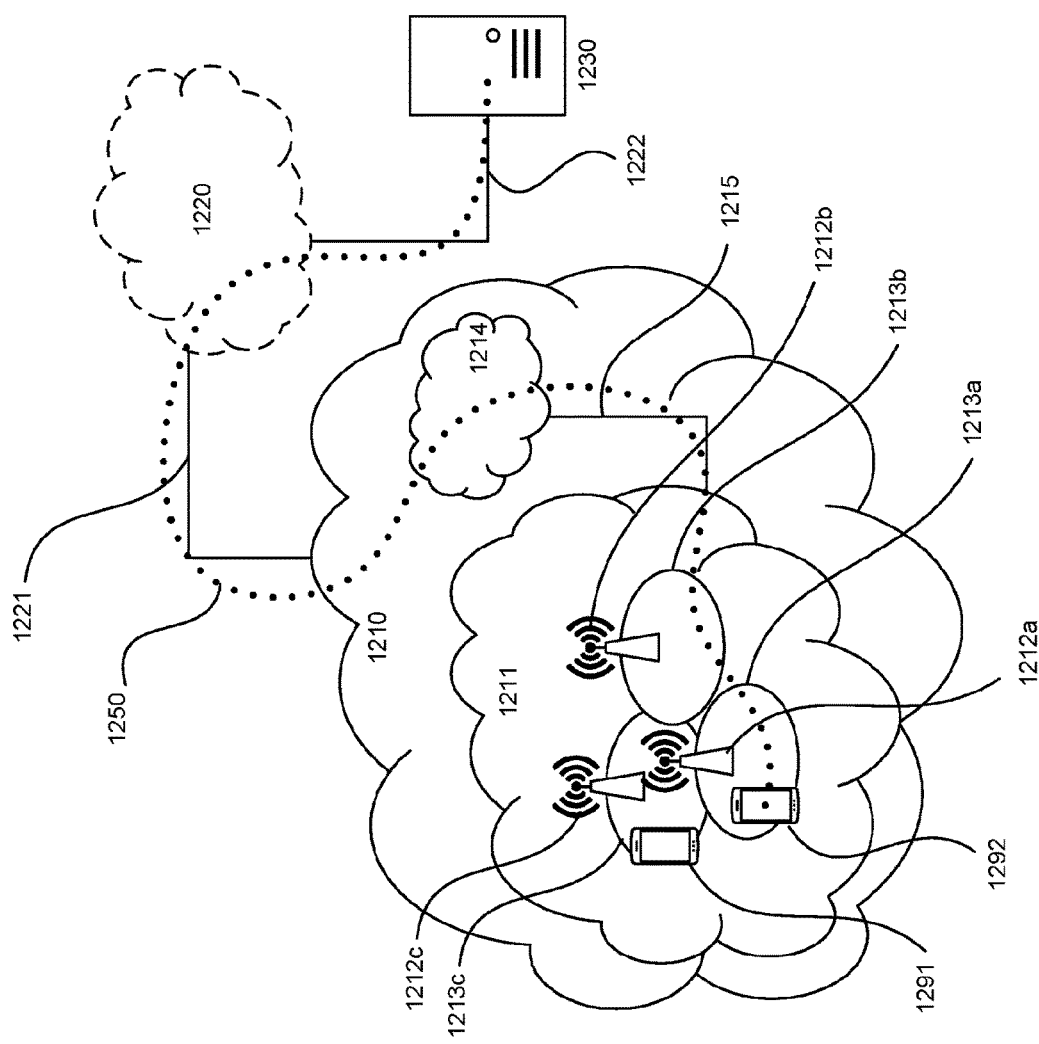
FIG. 12 is a block diagram of a communication network with a host computer according to some embodiments.

With reference to FIG. 12, in accordance with an embodiment, a communication system includes telecommunication network 1210, such as a 3GPP-type cellular network, which comprises access network 1211, such as a radio access network, and core network 1214. Access network 1211 comprises a plurality of base stations 1212*a*, 1212*b*, 1212*c*, such as NBs, eNBs, gNBs or other types of wireless access points, each defining a corresponding coverage area 1213*a*, 1213*b*, 1213*c*. Each base station 1212*a*, 1212*b*, 1212*c* is connectable to core network 1214 over a wired or wireless connection 1215. A first UE 1291 located in coverage area 1213*c* is configured to wirelessly connect to, or be paged by, the corresponding base station 1212*c*. A second UE 1292 in coverage area 1213*a* is wirelessly connectable to the corresponding base station 1212*a*. While a plurality of UEs 1291, 1292 are illustrated in this example, the disclosed embodiments are equally applicable to a situation where a sole UE is in the coverage area or where a sole UE is connecting to the corresponding base station 1212.

Telecommunication network 1210 is itself connected to host computer 1230, which may be embodied in the hardware and/or software of a standalone server, a cloud-implemented server, a distributed server or as processing resources in a server farm. Host computer 1230 may be under the ownership or control of a service provider, or may be operated by the service provider or on behalf of the service provider. Connections 1221 and 1222 between telecommunication network 1210 and host computer 1230 may extend directly from core network 1214 to host computer 1230 or may go via an optional intermediate network 1220. Intermediate network 1220 may be one of, or a combination of more than one of, a public, private or hosted network; intermediate network 1220, if any, may be a backbone network or the Internet; in particular, intermediate network 1220 may comprise two or more sub-networks (not shown).

The communication system of FIG. 12 as a whole enables connectivity between the connected UEs 1291, 1292 and host computer 1230. The connectivity may be described as an over-the-top (OTT) connection 1250. Host computer 1230 and the connected UEs 1291, 1292 are configured to communicate data and/or signaling via OTT connection 1250, using access network 1211, core network 1214, any intermediate network 1220 and possible further infrastructure (not shown) as intermediaries. OTT connection 1250 may be transparent in the sense that the participating communication devices through which OTT connection 1250 passes are unaware of routing of uplink and downlink communications. For example, base station 1212 may not or need not be informed about the past routing of an incoming downlink communication with data originating from host computer 1230 to be forwarded (e.g., handed over) to a connected UE 1291. Similarly, base station 1212 need not be aware of the future routing of an outgoing uplink communication originating from the UE 1291 towards the host computer 1230.

Example implementations, in accordance with an embodiment, of the UE, base station and host computer discussed in the preceding paragraphs will now be described with reference to FIG. 13. In communication system 1300, host computer 1310 comprises hardware 1315 including communication interface 1316 configured to set up and maintain a wired or wireless connection with an interface of a different communication device of communication system 1300. Host computer 1310 further comprises processing circuitry 1318, which may have storage and/or processing capabilities. In particular, processing circuitry 1318 may comprise one or more programmable processors, application-specific integrated circuits, field programmable gate arrays or combinations of these (not shown) adapted to execute instructions. Host computer 1310 further comprises software 1311, which is stored in or accessible by host computer 1310 and executable by processing circuitry 1318. Software 1311 includes host application 1312. Host application 1312 may be operable to provide a service to a remote user, such as UE 1330 connecting via OTT connection 1350 terminating at UE 1330 and host computer 1310. In providing the service to the remote user, host application 1312 may provide user data which is transmitted using OTT connection 1350.

Communication system 1300 further includes base station 1320 provided in a telecommunication system and comprising hardware 1325 enabling it to communicate with host computer 1310 and with UE 1330. Hardware 1325 may include communication interface 1326 for setting up and maintaining a wired or wireless connection with an interface of a different communication device of communication system 1300, as well as radio interface 1327 for setting up and maintaining at least wireless connection 1370 with UE 1330 located in a coverage area (not shown in FIG. 13) served by base station 1320. Communication interface 1326 may be configured to facilitate connection 1360 to host computer 1310. Connection 1360 may be direct or it may pass through a core network (not shown in FIG. 13) of the telecommunication system and/or through one or more intermediate networks outside the telecommunication system. In the embodiment shown, hardware 1325 of base station 1320 further includes processing circuitry 1328, which may comprise one or more programmable processors, application-specific integrated circuits, field programmable gate arrays or combinations of these (not shown) adapted to execute instructions. Base station 1320 further has software 1321 stored internally or accessible via an external connection.

Communication system 1300 further includes UE 1330 already referred to. Its hardware 1335 may include radio interface 1337 configured to set up and maintain wireless connection 1370 with a base station serving a coverage area in which UE 1330 is currently located. Hardware 1335 of UE 1330 further includes processing circuitry 1338, which may comprise one or more programmable processors, application-specific integrated circuits, field programmable gate arrays or combinations of these (not shown) adapted to execute instructions. UE 1330 further comprises software 1331, which is stored in or accessible by UE 1330 and executable by processing circuitry 1338. Software 1331 includes client application 1332. Client application 1332 may be operable to provide a service to a human or non-human user via UE 1330, with the support of host computer 1310. In host computer 1310, an executing host application 1312 may communicate with the executing client application 1332 via OTT connection 1350 terminating at UE 1330 and host computer 1310. In providing the service to the user, client application 1332 may receive request data from host application 1312 and provide user data in response to the request data. OTT connection 1350 may transfer both the request data and the user data. Client application 1332 may interact with the user to generate the user data that it provides.

Figure 13:
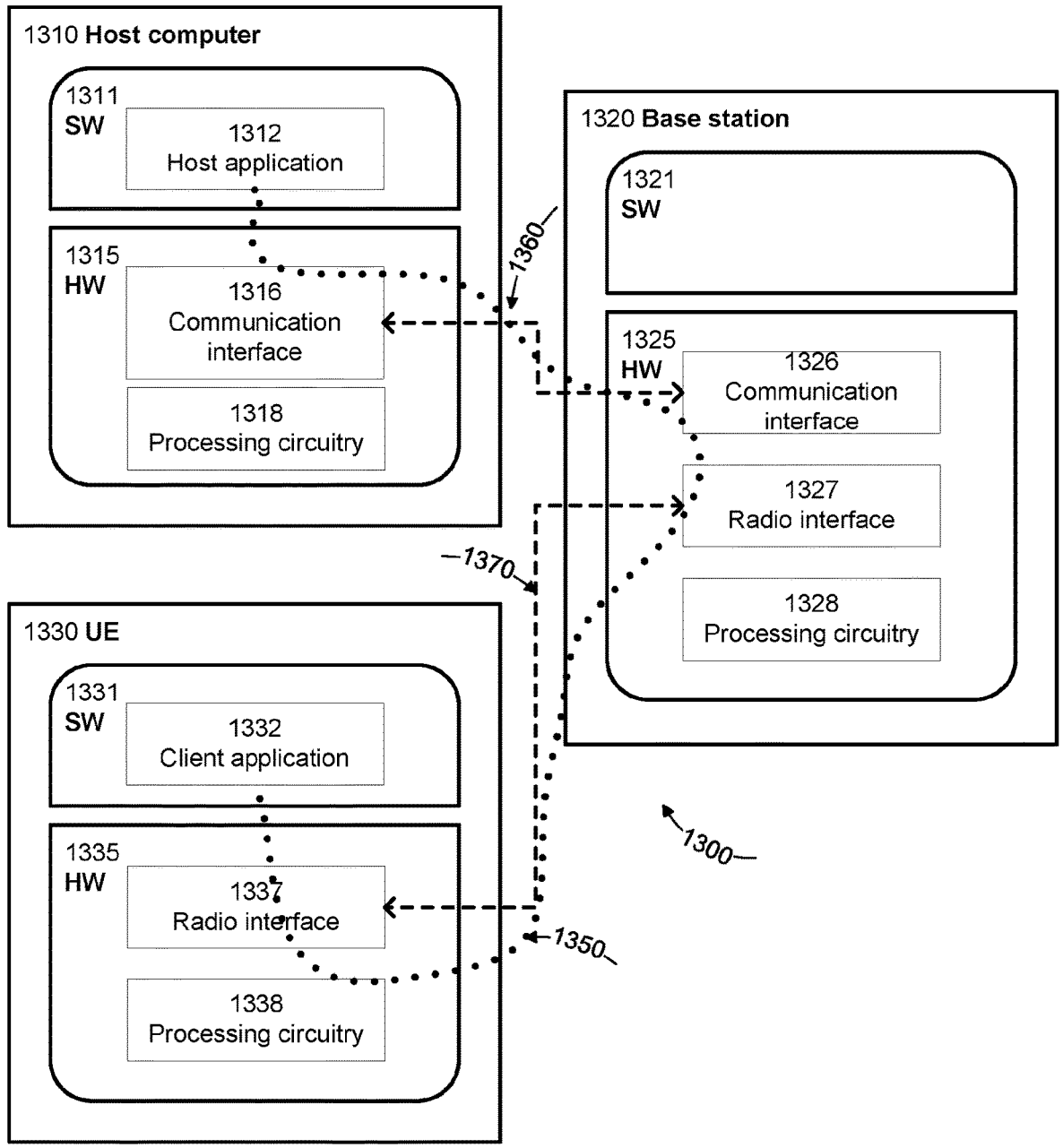
FIG. 13 is a block diagram of a host computer according to some embodiments.

It is noted that host computer 1310, base station 1320 and UE 1330 illustrated in FIG. 13 may be similar or identical to host computer 1230, one of base stations 1212a, 1212b, 1212c and one of UEs 1291, 1292 of FIG. 12, respectively. This is to say, the inner workings of these entities may be as shown in FIG. 13 and independently, the surrounding network topology may be that of FIG. 12.

In FIG. 13, OTT connection 1350 has been drawn abstractly to illustrate the communication between host computer 1310 and UE 1330 via base station 1320, without explicit reference to any intermediary devices and the precise routing of messages via these devices. Network infrastructure may determine the routing, which it may be configured to hide from UE 1330 or from the service provider operating host computer 1310, or both. While OTT connection 1350 is active, the network infrastructure may further take decisions by which it dynamically changes the routing (e.g., on the basis of load balancing consideration or reconfiguration of the network).

Wireless connection 1370 between UE 1330 and base station 1320 is in accordance with the teachings of the embodiments described throughout this disclosure. One or more of the various embodiments improve the performance of OTT services provided to UE 1330 using OTT connection 1350, in which wireless connection 1370 forms the last segment. More precisely, the teachings of these embodiments may improve the battery life of wireless devices and reduce signaling overhead and thereby provide benefits such as extended battery lifetime and reduced user waiting time.

A measurement procedure may be provided for the purpose of monitoring data rate, latency and other factors on which the one or more embodiments improve. There may further be an optional network functionality for reconfiguring OTT connection 1350 between host computer 1310 and UE 1330, in response to variations in the measurement results. The measurement procedure and/or the network functionality for reconfiguring OTT connection 1350 may be implemented in software 1311 and hardware 1315 of host computer 1310 or in software 1331 and hardware 1335 of UE 1330, or both. In embodiments, sensors (not shown) may be deployed in or in association with communication devices through which OTT connection 1350 passes; the sensors may participate in the measurement procedure by supplying values of the monitored quantities exemplified above, or supplying values of other physical quantities from which software 1311, 1331 may compute or estimate the monitored quantities. The reconfiguring of OTT connection 1350 may include message format, retransmission settings, preferred routing etc.; the reconfiguring need not affect base station 1320, and it may be unknown or imperceptible to base station 1320. Such procedures and functionalities may be known and practiced in the art. In certain embodiments, measurements may involve proprietary UE signaling facilitating host computer 1310's measurements of throughput, propagation times, latency and the like. The measurements may be implemented in that software 1311 and 1331 causes messages to be transmitted, in particular empty or 'dummy' messages, using OTT connection 1350 while it monitors propagation times, errors etc.

Figure 14:
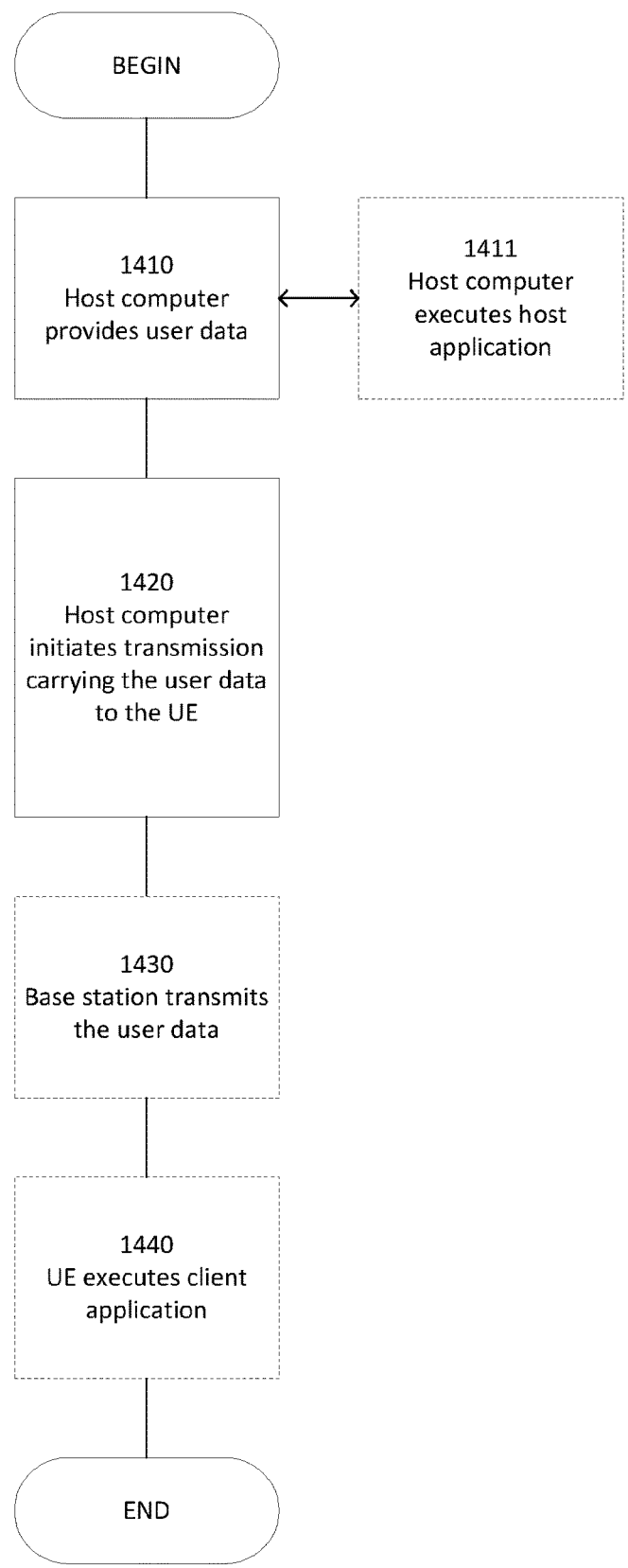
FIG. 14 is a flowchart illustrating a method implemented in a communication system, in accordance with one embodiment.

FIG. 14 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 14 will be included in this section. In step 1410, the host computer provides user data. In substep 1411 (which may be optional) of step 1410, the host computer provides the user data by executing a host application. In step 1420, the host computer initiates a transmission carrying the user data to the UE. In step 1430 (which may be optional), the base station transmits to the UE the user data which was carried in the transmission that the host computer initiated, in accordance with the teachings of the embodiments described throughout this disclosure. In step 1440 (which may also be optional), the UE executes a client application associated with the host application executed by the host computer.

Figure 15:
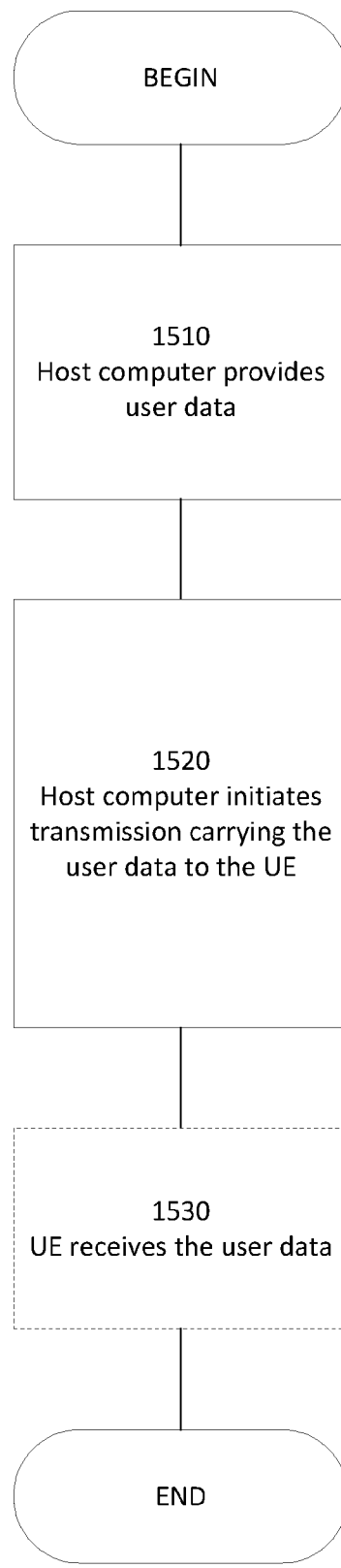
FIG. 15 is a flowchart illustrating a method implemented in a communication system, in accordance with one embodiment.

FIG. 15 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 15 will be included in this section. In step 1510 of the method, the host computer provides user data. In an optional substep (not shown) the host computer provides the user data by executing a host application. In step 1520, the host computer initiates a transmission carrying the user data to the UE. The transmission may pass via the base station, in accordance with the teachings of the embodiments described throughout this disclosure. In step 1530 (which may be optional), the UE receives the user data carried in the transmission.

Figure 16:
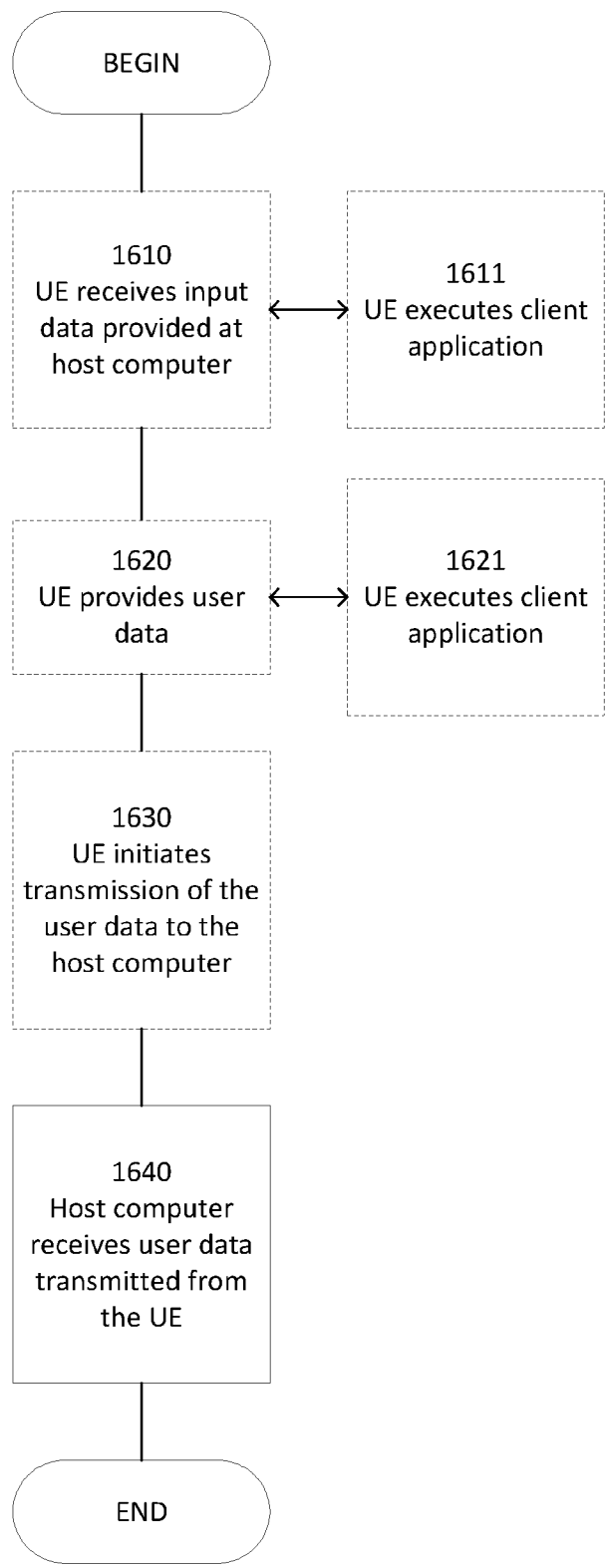
FIG. 16 is a flowchart illustrating a method implemented in a communication system, in accordance with one embodiment.

FIG. 16 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 16 will be included in this section. In step 1610 (which may be optional), the UE receives input data provided by the host computer. Additionally or alternatively, in step 1620, the UE provides user data. In substep 1621 (which may be optional)

of step 1620, the UE provides the user data by executing a client application. In substep 1611 (which may be optional) of step 1610, the UE executes a client application which provides the user data in reaction to the received input data provided by the host computer. In providing the user data, the executed client application may further consider user input received from the user. Regardless of the specific manner in which the user data was provided, the UE initiates, in substep 1630 (which may be optional), transmission of the user data to the host computer. In step 1640 of the method, the host computer receives the user data transmitted from the UE, in accordance with the teachings of the embodiments described throughout this disclosure.

Figure 17:
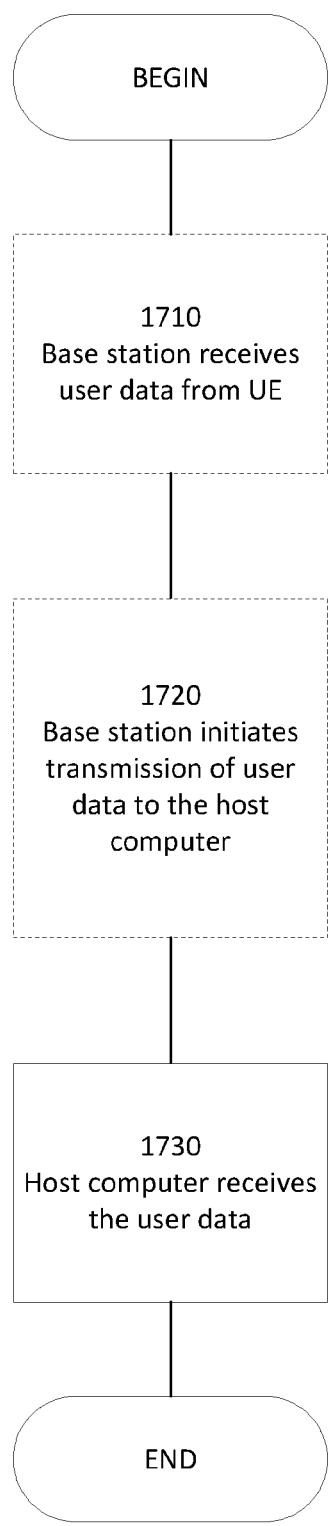
FIG. 17 is a flowchart illustrating a method implemented in a communication system, in accordance with one embodiment.

FIG. 17 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 17 will be included in this section. In step 1710 (which may be optional), in accordance with the teachings of the embodiments described throughout this disclosure, the base station receives user data from the UE. In step 1720 (which may be optional), the base station initiates transmission of the received user data to the host computer. In step 1730 (which may be optional), the host computer receives the user data carried in the transmission initiated by the base station.

In view of the above, embodiments herein generally include a communication system including a host computer. The host computer may comprise processing circuitry configured to provide user data. The host computer may also comprise a communication interface configured to forward the user data to a cellular network for transmission to a user equipment (UE). The cellular network may comprise a base station having a radio interface and processing circuitry, the base station's processing circuitry configured to perform any of the steps of any of the embodiments described above for a base station.

In some embodiments, the communication system further includes the base station.

In some embodiments, the communication system further includes the UE, wherein the UE is configured to communicate with the base station.

In some embodiments, the processing circuitry of the host computer is configured to execute a host application, thereby providing the user data. In this case, the UE comprises processing circuitry configured to execute a client application associated with the host application.

Embodiments herein also include a method implemented in a communication system including a host computer, a base station and a user equipment (UE). The method comprises, at the host computer, providing user data. The method may also comprise, at the host computer, initiating a transmission carrying the user data to the UE via a cellular network comprising the base station. The base station performs any of the steps of any of the embodiments described above for a base station.

In some embodiments, the method further comprising, at the base station, transmitting the user data.

In some embodiments, the user data is provided at the host computer by executing a host application. In this case, the method further comprises, at the UE, executing a client application associated with the host application.

Embodiments herein also include a user equipment (UE) configured to communicate with a base station. The UE comprises a radio interface and processing circuitry configured to perform any of the embodiments above described for a UE.

Embodiments herein further include a communication system including a host computer. The host computer comprises processing circuitry configured to provide user data, and a communication interface configured to forward user data to a cellular network for transmission to a user equipment (UE). The UE comprises a radio interface and processing circuitry. The UE's components are configured to perform any of the steps of any of the embodiments described above for a UE.

In some embodiments, the cellular network further includes a base station configured to communicate with the UE.

In some embodiments, the processing circuitry of the host computer is configured to execute a host application, thereby providing the user data. The UE's processing circuitry is configured to execute a client application associated with the host application.

Embodiments also include a method implemented in a communication system including a host computer, a base station and a user equipment (UE). The method comprises, at the host computer, providing user data and initiating a transmission carrying the user data to the UE via a cellular network comprising the base station. The UE performs any of the steps of any of the embodiments described above for a UE.

In some embodiments, the method further comprises, at the UE, receiving the user data from the base station.

Embodiments herein further include a communication system including a host computer. The host computer comprises a communication interface configured to receive user data originating from a transmission from a user equipment (UE) to a base station. The UE comprises a radio interface and processing circuitry. The UE's processing circuitry is configured to perform any of the steps of any of the embodiments described above for a UE.

In some embodiments the communication system further includes the UE.

In some embodiments, the communication system further including the base station. In this case, the base station comprises a radio interface configured to communicate with the UE and a communication interface configured to forward to the host computer the user data carried by a transmission from the UE to the base station.

In some embodiments, the processing circuitry of the host computer is configured to execute a host application. And the UE's processing circuitry is configured to execute a client application associated with the host application, thereby providing the user data.

In some embodiments, the processing circuitry of the host computer is configured to execute a host application, thereby providing request data. And the UE's processing circuitry is configured to execute a client application associated with the host application, thereby providing the user data in response to the request data.

Embodiments herein also include a method implemented in a communication system including a host computer, a base station and a user equipment (UE). The method comprises, at the host computer, receiving user data transmitted to the base station from the UE. The UE performs any of the steps of any of the embodiments described above for the UE.

In some embodiments, the method further comprises, at the UE, providing the user data to the base station.

In some embodiments, the method also comprises, at the UE, executing a client application, thereby providing the user data to be transmitted. The method may further comprise, at the host computer, executing a host application associated with the client application.

In some embodiments, the method further comprises, at the UE, executing a client application, and, at the UE, receiving input data to the client application. The input data is provided at the host computer by executing a host application associated with the client application. The user data to be transmitted is provided by the client application in response to the input data.

Embodiments also include a communication system including a host computer. The host computer comprises a communication interface configured to receive user data originating from a transmission from a user equipment (UE) to a base station. The base station comprises a radio interface and processing circuitry. The base station's processing circuitry is configured to perform any of the steps of any of the embodiments described above for a base station.

In some embodiments, the communication system further includes the base station.

In some embodiments, the communication system further includes the UE. The UE is configured to communicate with the base station.

In some embodiments, the processing circuitry of the host computer is configured to execute a host application. And the UE is configured to execute a client application associated with the host application, thereby providing the user data to be received by the host computer.

Embodiments moreover include a method implemented in a communication system including a host computer, a base station and a user equipment (UE). The method comprises, at the host computer, receiving, from the base station, user data originating from a transmission which the base station has received from the UE. The UE performs any of the steps of any of the embodiments described above for a UE.

In some embodiments, the method further comprises, at the base station, receiving the user data from the UE.

In some embodiments, the method further comprises, at the base station, initiating a transmission of the received user data to the host computer.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 18:
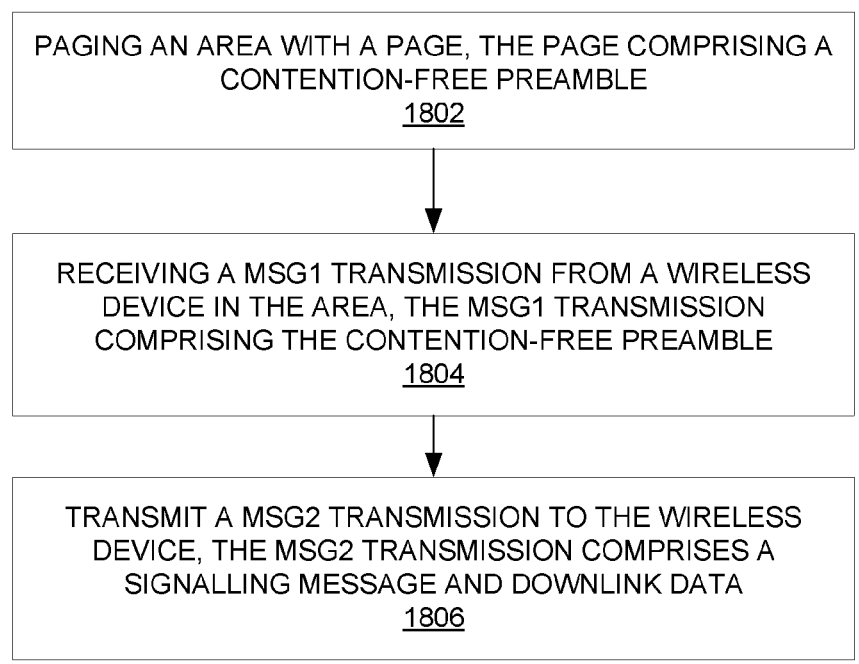
FIG. 18 is a flowchart illustrating a method for mobile-terminated early data transmission during a random-access procedure, in accordance with particular embodiments.

FIG. 18 depicts a method (e.g., performed by a network node such as a base station) for mobile-terminated early data transmission during a random-access procedure, in accordance with particular embodiments. The method begins at step 1802 paging an area with a page. The page comprises a contention-free preamble. For example, a network node, upon indication that there is data to transmit to a wireless device that is suspected to be in the paging area of the network node may page the area with a page including a contention-free preamble. If in the paging area, the wireless device may receive the page with the preamble and attempt random access with the network.

At step 1804, the network node may receive a Msg1 transmission from a wireless device in the area. The Msg1 transmission comprises the contention-free preamble. For example, the wireless device in the paging area may receive the page and in response, send a Msg1 transmission including the preamble in the page. In this manner, the network node may recognize the source of the Msg1 transmission, thereby enabling further communication.

Although not shown, the method may further comprise requesting a core network node to resume a connection with the wireless device. Alternatively or additionally, the method may further comprise re-activating access spectrum security and radio bearers.

At step 1806, the network node may transmit a Msg2 transmission to the wireless device. The Msg2 transmission comprises a signalling message and downlink data. For example, the network node may send early data in the Msg2 data together with an RRC message. The network node or a core network node in the network may determine to provide downlink data in Msg2 based on the size of the downlink data and the availability of the wireless device to receive mobile-terminated early data transmissions.

More particularly, the method in some embodiments further comprises determining downlink data available to transmit to a wireless device before paging the area with the page. Alternatively or additionally, the method may include determining whether to include the downlink data in the Msg2 transmission based on a size of the downlink data and an early data transmission capability of the wireless device. In other embodiments, the method may further comprise receiving an indication to include downlink data in the Msg2 transmission a core network node.

In certain embodiments, the Msg2 transmission further includes an indication to send a security response. For example, to provide additional security and reliability of the data transmission, it may be required that the wireless device confirm the transmission. This may be provided by an explicit indication in Msg2 or implicitly based on the signalling message. In some embodiments not shown, then, the method may further comprise receiving a security response message to the network node in response to receiving the Msg2 transmission.

In certain embodiments, the Msg2 transmission may indicate that the connection between wireless device and the network node be suspended or released. For example, if there is no additional downlink data beyond that included in Msg2, the connection may be released. Accordingly, additional signalling overhead may be avoided.

In other embodiments, the signaling message of the Msg2 transmission indicates a fallback to legacy connection setup. In this case, the method further comprises completing a setup procedure with the wireless device.

In some embodiments, the method further comprises receiving, in response to the Msg2 transmission, a Msg3 transmission. In one such embodiment, the Msg3 transmission comprises early uplink data.

Figure 19:
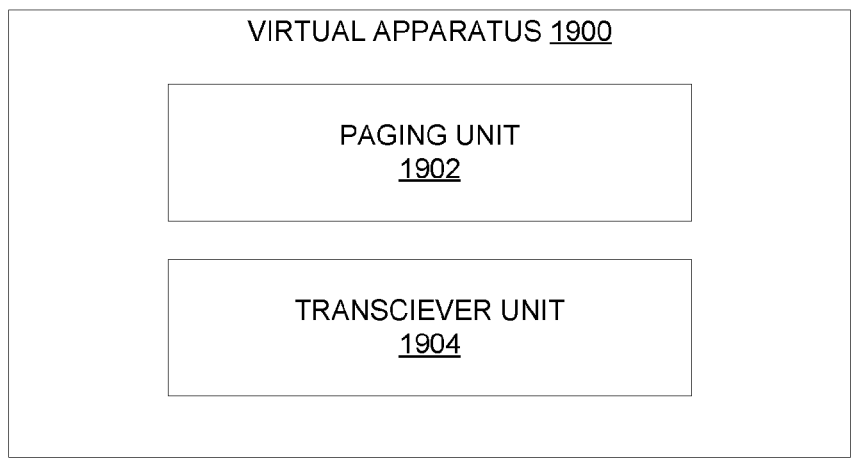
FIG. 19 is a block diagram of an apparatus in a wireless network according to some embodiments.

FIG. 19 illustrates a schematic block diagram of an apparatus 1900 in a wireless network (for example, the wireless network shown in FIG. 9). The apparatus may be implemented in a wireless device or network node (e.g., wireless device 910 or network node 960 shown in FIG. 9). Apparatus 1900 is operable to carry out the example method described with reference to FIG. 18 and possibly any other processes or methods disclosed herein. It is also to be understood that the method of FIG. 18 is not necessarily carried out solely by apparatus 1900. At least some operations of the method can be performed by one or more other entities.

Virtual Apparatus 1900 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause paging unit 1902, transceiver unit 1904, and any other suitable units of apparatus 1900 to perform corresponding functions according one or more embodiments of the present disclosure.

As illustrated in FIG. 19, apparatus 1900 includes paging unit 1902 and transceiver unit 1904. Paging unit 1902 is configured to paging an area with a page. The page comprising a contention-free preamble. For example, in response to the network determining to resume or connect to a wireless device suspected to be within the network node's paging area, the network may cause the network node to page the area in attempt to cause the random access of wireless device.

Transceiver unit 1904 is configured to receive a Msg1 from a wireless device in the area. The Msg1 transmission comprises the contention-free preamble. For example, the wireless device may receive the page and respond with the Msg1 transmission including the preamble, thereby allowing the network node to identify the source of the Msg1 transmission. Transceiver unit 1904 is further configured to transmit a Msg2 transmission to the wireless device. The Msg2 transmission comprises a signalling message and downlink data. For example, the network node may couple both the signalling message and downlink data in the Msg2 transmission. The wireless device may, as a result, receive a mobile-terminated early data transmission in Msg2.

Figure 20:
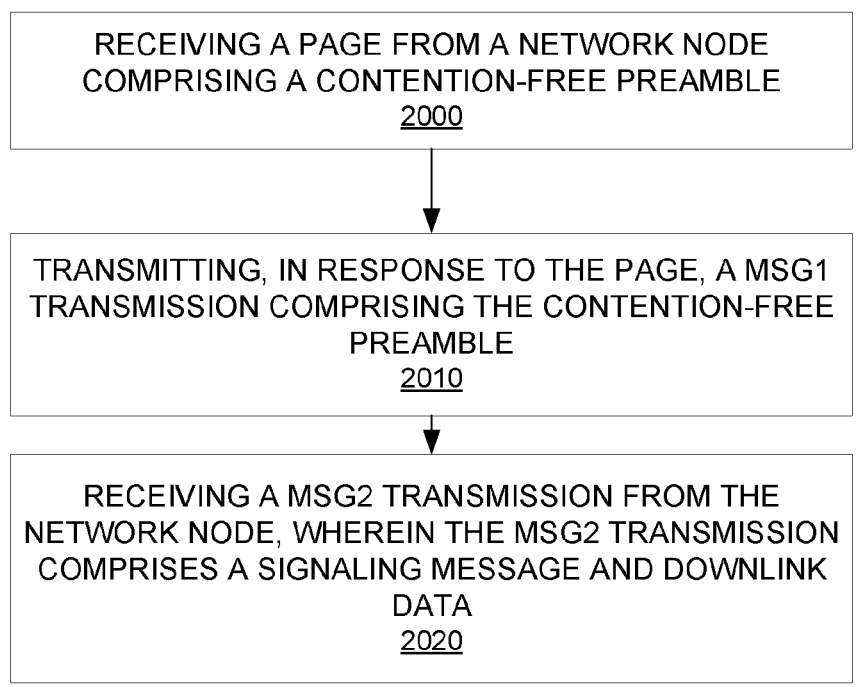
FIG. 20 is a flowchart illustrating a method for receiving a mobile-terminated early data transmission during a random-access procedure, in accordance with particular embodiments.

FIG. 20 depicts a method (e.g., performed by a wireless device such as a UE) for receiving a mobile-terminated early data transmission during a random-access procedure, in accordance with particular embodiments. The method includes, at step 2000, receiving a page from a network node comprising a contention-free preamble. The method at step 2010 further comprises transmitting, in response to the page, a Msg1 transmission comprising the contention-free preamble. The method then includes at step 2020 receiving a Msg2 transmission from the network node, wherein the Msg2 transmission comprises a signaling message and downlink data.

In some embodiments, the method further comprises re-activating access stratum security and radio bearers.

In some embodiments, the Msg2 transmission further comprises an indication to send a security response.

In some embodiments, the method further comprises sending a security response message to the network node in response to receiving the Msg2 transmission.

In some embodiments, the method further comprises checking the integrity of the Msg2 transmission using activated access stratum security, and, if it is determined that the Msg2 transmission passes the integrity check, deciphering the downlink data in the Msg2 transmission.

In some embodiments, the signaling message of the Msg2 transmission indicates that a connection between the wireless device and the network node is to be suspended or released. In one such embodiment, the method further comprises remaining in an idle mode, and releasing or suspending resource blocks and access spectrum security.

In other embodiments, the signaling message of the Msg2 transmission indicates a fallback to legacy connection setup. In this case, the method further comprises sending a signaling message to complete a setup procedure.

In some embodiments, the method further comprises sending, in response to the Msg2 transmission, a Msg3 transmission. In one such embodiment, the Msg3 transmission comprises early uplink data.

Figure 21:
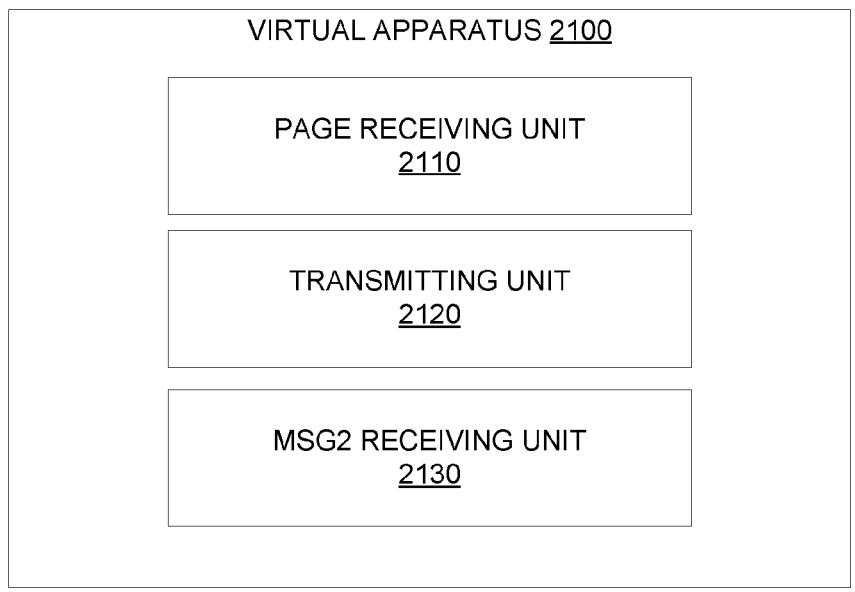
FIG. 21 is a block diagram of an apparatus in a wireless network according to some embodiments.

FIG. 21 illustrates a schematic block diagram of an apparatus 2100 in a wireless network (for example, the wireless network shown in FIG. 9). The apparatus may be implemented in a wireless device or network node (e.g., wireless device 910 or network node 960 shown in FIG. 9). Apparatus 2100 is operable to carry out the example method described with reference to FIG. 20 and possibly any other processes or methods disclosed herein. It is also to be understood that the method of FIG. 20 is not necessarily carried out solely by apparatus 2100. At least some operations of the method can be performed by one or more other entities.

Virtual Apparatus 2100 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause page receiving unit 2110, transmitting unit 2120, Msg2 receiving unit 2130, and any other suitable units of apparatus 2100 to perform corresponding functions according one or more embodiments of the present disclosure.

As illustrated in FIG. 21, apparatus 2100 includes page receiving unit 2110, transmitting unit 2120, and Msg2 receiving unit 2130. Page receiving unit 2110 is receive a page from a network node. The page comprises a contention-free preamble.

Transmitting unit 2120 is configured to transmit, in response to the page, a Msg1 transmission. The Msg1 transmission comprises the contention-free preamble. For example, the wireless device may receive the page and respond with the Msg1 transmission including the preamble, thereby allowing the network node to identify the source of the Msg1 transmission. Msg2 receiving unit 2130 is configured to receive a Msg2 transmission from the network node. The Msg2 transmission comprises a signalling message and downlink data. For example, the network node may couple both the signalling message and downlink data in the Msg2 transmission. The wireless device may, as a result, receive a mobile-terminated early data transmission in Msg2.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

In some embodiments a computer program, computer program product or computer readable storage medium comprises instructions which when executed on a computer perform any of the embodiments disclosed herein. In further examples the instructions are carried on a signal or carrier and which are executable on a computer wherein when executed perform any of the embodiments disclosed herein.

Notes that some of the embodiments contemplated herein were described with reference to the accompanying drawings. Other embodiments, however, are contained within the scope of the subject matter disclosed herein. The disclosed subject matter should therefore not be construed as limited to only the embodiments set forth herein; rather, these embodiments are provided by way of example to convey the scope of the subject matter to those skilled in the art.

What is claimed is:

1. A method performed by a network node for transmitting a mobile-terminated early data transmission during a random-access procedure, the method comprising:
    transmitting a page comprising a contention-free preamble corresponding to an identity associated with a wireless device to be paged, the identity being one of a Serving Temporary Mobile Subscriber Identity (S-TMSI) and a resume identity that identifies a suspended Radio Resource Control (RRC) connection;
    receiving, as part of the random-access procedure, a Msg1 transmission that comprises the contention-free preamble;
    upon receiving the Msg1 transmission, re-activating access stratum security for the wireless device associated with the identity that corresponds to the contention-free preamble comprised in the Msg1 transmission; and
    transmitting, as part of the random-access procedure, a Msg2 transmission to the wireless device associated with the identity corresponding to the contention-free preamble, the Msg2 transmission comprising a signaling message and downlink data, and protecting the Msg2 transmission using the re-activated access stratum security.

2. The method of claim 1, further comprising, responsive to receiving the Msg1 transmission, using the identity corresponding to the contention-free preamble comprised in the Msg1 transmission to one of establish and resume a connection that is with a core network node and that is for the wireless device associated with the identity.

3. The method of claim 2, further comprising receiving the downlink data for the wireless device over the one of the established and the resumed connection with the core network node.

4. The method of claim 3, wherein receiving the downlink data comprises receiving the downlink data in a non-access stratum (NAS) message which is protected with NAS security associated with the identity corresponding to the contention-free preamble comprised in the Msg1 transmission, and wherein transmitting the Msg2 transmission comprises forwarding the NAS message with the downlink data to the wireless device in a RRC message.

5. The method of claim 1, further comprising receiving a paging message from a core network node, wherein the paging message includes the identity associated with the wireless device, and wherein the page is transmitted responsive to reception of the paging message from the core network node.

6. The method of claim 2, wherein the identity is the resume identity, and wherein the core network node is a serving gateway (S-GW).

7. The method of claim 2, wherein the identity is the S-TMSI, and wherein the core network node is a mobility management entity (MME).

8. The method of claim 1, further comprising, upon receiving the Msg1 transmission, determining the identity associated with the wireless device from which the Msg1 transmission is received, by determining which identity corresponds to the contention-free preamble comprised in the Msg1 transmission.

9. The method of claim 1, wherein the Msg1 transmission does not include the identity associated with the wireless device.

10. The method of claim 1, further comprising transmitting the Msg2 transmission using a Radio Network Temporary Identity that is specific to the wireless device and specific for mobile-terminated early data transmission.

11. The method of claim 1, further comprising selecting, from a group of contention-free preambles that is not specific for early data transmission, the contention-free preamble to correspond to the identity associated with the wireless device to be paged.

12. A method performed by a wireless device for receiving a mobile-terminated early data transmission during a random-access procedure, the method comprising:
    receiving, from a network node, a page comprising a contention-free preamble corresponding to an identity associated with the wireless device, the identity being one of a Serving Temporary Mobile Subscriber Identity (S-TMS) and a resume identity that identifies a suspended Radio Resource Control (RRC) connection;
    after receiving the page but before receiving a Msg2 transmission, re-activating access stratum (AS) security associated with the identifier corresponding to the contention-free preamble;
    transmitting, in response to the page and as part of the random-access procedure, a Msg1 transmission that comprises the contention-free preamble;

receiving, as part of the random-access procedure, a Msg2 transmission from the network node, the Msg2 transmission comprising a signaling message and downlink data; and at least one of checking an integrity of the signaling message and de-ciphering the downlink data, using security associated with the identifier corresponding to the contention-free preamble.

13. The method of claim 12, wherein the identifier is the S-TMSI and wherein said security is non-access stratum (NAS) security.

14. The method of claim 12, wherein the identifier is the resume identity and wherein said security is AS security.

15. The method of claim 12, wherein the Msg1 transmission does not include the identity associated with the wireless device.

16. The method of claim 12, further comprising monitoring for the Msg2 transmission using a Radio Network Temporary Identity that is specific to the wireless device and specific for mobile-terminated early data transmission.

17. The method of claim 12, wherein the contention-free preamble is not specific for early data transmission.

18. The method of claim 12, further comprising decoding the contention-free preamble comprised in the page as a function of information known by the wireless device and by a core network node that initiated the page.

19. A network node for transmitting a mobile-terminated early data transmission during a random-access procedure, the network node comprising:
communication circuitry; and
processing circuitry configured to:
transmit a page comprising a contention-free preamble corresponding to an identity associated with a wireless device to be paged, the identity being one of a Serving Temporary Mobile Subscriber Identity (S-TMS) and a resume identity that identifies a suspended Radio Resource Control (RRC) connection;
upon receiving the Msg1 transmission, re-activate access stratum security for the wireless device associated with the identity that corresponds to the contention-free preamble comprised in the Msg1 transmission;
receive, as part of the random-access procedure, a Msg1 transmission that comprises the contention-free preamble; and
transmit, as part of the random-access procedure, a Msg2 transmission to the wireless device associated with the identity corresponding to the contention-free preamble, the Msg2 transmission comprising a signaling message and downlink data, and protect the Msg2 transmission using the re-activated access stratum security.

20. A wireless device for receiving a mobile-terminated early data transmission during a random-access procedure, the wireless device comprising:
communication circuitry; and
processing circuitry configured to:
receive, from a network node, a page comprising a contention-free preamble corresponding to an identity associated with the wireless device, the identity being one of a Serving Temporary Mobile Subscriber Identity (S-TMS) and a resume identity that identifies a suspended Radio Resource Control (RRC) connection;
after receiving the page but before receiving a Msg2 transmission, re-activate access stratum (AS) security associated with the identifier corresponding to the contention-free preamble;
transmit, in response to the page and as part of the random-access procedure, a Msg1 transmission that comprises the contention-free preamble;
receive, as part of the random-access procedure, a Msg2 transmission from the network node, the Msg2 transmission comprising a signaling message and downlink data; and
at least one of check an integrity of the signaling message and de-cipher the downlink data using security associated with the identifier corresponding to the contention-free preamble.

* * * * *